(12) United States Patent
Parvulescu et al.

(10) Patent No.: US 11,554,964 B2
(45) Date of Patent: Jan. 17, 2023

(54) PROCESS FOR PREPARING A ZEOLITIC MATERIAL HAVING A FRAMEWORK TYPE FER

(71) Applicant: BASF SE, Ludwigshafen am Rhein (DE)

(72) Inventors: Andrei-Nicolae Parvulescu, Ludwigshafen (DE); Robert McGuire, Florham Park, NJ (US); Ulrich Mueller, Ludwigshafen (DE); Alexander Kromer, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 45 days.

(21) Appl. No.: 17/058,338

(22) PCT Filed: Jul. 26, 2019

(86) PCT No.: PCT/EP2019/070157
§ 371 (c)(1),
(2) Date: Nov. 24, 2020

(87) PCT Pub. No.: WO2020/021054
PCT Pub. Date: Jan. 30, 2020

(65) Prior Publication Data
US 2021/0198114 A1 Jul. 1, 2021

(30) Foreign Application Priority Data
Jul. 27, 2018 (EP) .................................. 18185968

(51) Int. Cl.
*C01B 39/44* (2006.01)
*C01B 39/04* (2006.01)
*F01N 3/20* (2006.01)

(52) U.S. Cl.
CPC ............ *C01B 39/445* (2013.01); *C01B 39/04* (2013.01); *F01N 3/2066* (2013.01);
(Continued)

(58) Field of Classification Search
CPC combination set(s) only.
See application file for complete search history.

(56) References Cited

U.S. PATENT DOCUMENTS 4,251,499 A 2/1981 Nanne et al.
9,782,759 B2 * 10/2017 Schmidt ................ C01B 39/065
(Continued)

FOREIGN PATENT DOCUMENTS

EP 0 012 473 A1 6/1980
EP 0 236 590 A1 9/1987
(Continued)

OTHER PUBLICATIONS

International Search Report dated Oct. 11, 2019 in PCT/EP2019/070157 filed on Jul. 26, 2019.
(Continued)

*Primary Examiner* — Binh Q Tran
(74) *Attorney, Agent, or Firm* — Finnegan, Henderson, Farabow, Garrett & Dunner, LLP

(57) ABSTRACT

The present invention relates to a process for preparing a zeolitic material having a framework type FER and having a framework structure comprising silicon, aluminum, and oxygen, said process comprising (i) preparing an aqueous synthesis mixture comprising water; a zeolitic material having a framework type other than FER and having a framework structure comprising silicon, aluminum, and oxygen; a source of silicon other than the zeolitic material having a framework type other than FER; an organic structure directing agent comprising piperidine; a source of an alkali metal; and a source of a base; (ii) subjecting the
(Continued)

aqueous synthesis mixture prepared according to (i) to hydrothermal synthesis conditions comprising heating the synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER.

20 Claims, 3 Drawing Sheets

(52) U.S. Cl.
CPC ...... *C01P 2006/14* (2013.01); *F01N 2250/12* (2013.01); *F01N 2570/14* (2013.01)

(56) References Cited

U.S. PATENT DOCUMENTS

| | | | |
|---|---|---|---|
| 10,710,891 B1* | 7/2020 | Moulton | C01B 39/026 |
| 2013/0266785 A1* | 10/2013 | Chen | B01J 20/28064 |
| | | | 252/194 |
| 2013/0281284 A1* | 10/2013 | Matsuo | B01J 35/002 |
| | | | 502/64 |
| 2014/0128248 A1 | 5/2014 | Petushkov et al. | |
| 2016/0115039 A1* | 4/2016 | Okubo | B01J 29/83 |
| | | | 423/709 |
| 2016/0122192 A1* | 5/2016 | Dusselier | C01B 39/04 |
| | | | 208/135 |
| 2019/0126258 A1* | 5/2019 | Schwieger | B01J 20/28019 |
| 2020/0061593 A1* | 2/2020 | Kamakoti | B01J 35/1057 |

FOREIGN PATENT DOCUMENTS

| | | |
|---|---|---|
| WO | WO 2011/158218 A1 | 12/2011 |
| WO | WO 2013/068976 A1 | 5/2013 |

OTHER PUBLICATIONS

Roman-Leshkov et al., "Impact of Controlling the Site Distribution of Al Atoms on Catalytic Properties in Ferrierite-Type Zeolites", Journal of Physical Chemistry, 2011, vol. 115, No. 4, pp. 1096-1102, XP002719081.

Sano et al., "High Potential of Interzeolite Conversion Method for Zeolite Synthesis", Journal of the Japan Petroleum Institute, 2013, vol. 56, No. 4, pp. 183-197, XP055352000.

\* cited by examiner

PROCESS FOR PREPARING A ZEOLITIC MATERIAL HAVING A FRAMEWORK TYPE FER

The present invention relates to a process for preparing a zeolitic material having a framework type FER and having a framework structure comprising silicon, aluminum, and oxygen. Further, the present invention relates to a solid material comprising a zeolitic material having a framework type FER, which may be obtained or obtainable by said process, and to an aqueous solution used in said process. The present invention further relates to the use of said solid material as a catalytically active material, as a catalyst, or as a catalyst component.

Zeolites are often synthesized through a hydrothermal treatment of an aqueous solution containing a silica source, aluminum source and optionally an organic template. To obtain the targeted structure, several parameters need proper control, such as the structure of the organic template, the temperature, the crystallization time, etc. For example, Hai-yan Zhang et al., "Organotemplate-free synthesis of high-silica ferrierite zeolite induced by CDO-structure zeolite buikding units, J. Mater. Chem., 2011, 21, 9494, disclose the synthesis of zeolitic materials having a framework type FER without template and using COD seed crystals.

Zhenchao Zhao et al., "Insights into the topotactic conversion process from layered silicate RUB-36 to FER-type zeolite by layer assembly", Chem. Mater., 2013, 25, 840-847, disclose another type of synthesis of zeolitic material having a framework type FER which is based on the topotactic conversion of layered silicate RUB-36 using a lamellar precursor of ferrierite in the presence of a surfactant.

Gabrielly Pal-Borbely et al., "Solid-state recrystallization of aluminum-containing kanemite varieties to ferrierite", Microporous and Mesoporous Materials 35-36 (2000), 573-584, disclose a solid-synthesis of zeolitic material having a framework type FER using piperidine as a template provided that a thermal pre-treatment is performed around the boiling point of the template prior to the recrystallization at higher temperatures.

Yu Wang et al., "ZSM-5 and ferrierite synthesized by magadiite conversion method in 1,6-hexethylenediamine system", Microporous and Mesoporous Materials 208 (2015), 66-71, disclose a synthesis of ferrierite using a 1,6-hexethylenediamine system. However, there was still a need to provide improved process for preparing a zeolitic material having a framework type FER which would present new properties and/or activities.

Therefore, it was an object of the present invention to provide an improved process for preparing a zeolitic material having a framework type FER and having a framework structure comprising silicon, aluminum, and oxygen which exhibits new properties and/or activities.

Therefore, the present invention relates to a process for preparing a zeolitic material having a framework type FER and having a framework structure comprising silicon, aluminum, and oxygen, said process comprising (i) preparing an aqueous synthesis mixture comprising water; a zeolitic material having a framework type other than FER and having a framework structure comprising silicon, aluminum, and oxygen; a source of silicon other than the zeolitic material having a framework type other than FER; an organic structure directing agent comprising piperidine; a source of an alkali metal; and a source of a base;

(ii) subjecting the aqueous synthesis mixture prepared according to (i) to hydrothermal synthesis conditions comprising heating the synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER.

As to the mixture prepared in (i) and subjected to (ii), it is preferred that in the framework structure of the zeolitic material having a framework type other than FER, the molar ratio of silicon relative to aluminum, calculated as $SiO_2$:$Al_2O_3$, is in the range of from 2:1 to 40:1, more preferably in the range of from 2:1 to 30:1.

It is preferred that, in the mixture prepared in (i) and subjected to (ii), from 95 to 100 weight-%, more preferably from 98 to 100 weight-%, more preferably from 99 to 100 weight-% of the framework structure of the zeolitic material having a framework type other than FER consist of Si, Al, O, and optionally H.

As to the mixture prepared in (i) and subjected to (ii), it is preferred that the zeolitic material having a framework type other than FER comprises an alkali metal M, more preferably one or more of sodium and potassium, more preferably sodium.

More preferably, in the zeolitic material having a framework type other than FER, the molar ratio of silicon relative to alkali metal M, calculated as $SiO_2$:$M_2O$, is in the range of from 1:1 to 500:1, more preferably in the range of from 1:1 to 250:1, more preferably in the range of from 1:1 to 150:1.

It is more preferred that in the mixture prepared in (i) and subjected to (ii), from 95 to 100 weight-%, more preferably from 98 to 100 weight-%, more preferably from 99 to 100 weight-% of the zeolitic material having a framework type other than FER consist of Si, Al, O, M, and optionally H.

As to the mixture prepared in (i) and subjected to (ii), it is preferred that the framework type of the zeolitic material having a framework type other than FER is a framework type which is one or more of FAU, CHA, LEV and AEI, more preferably FAU or CHA or LEV or AEI.

According to a first aspect of the present invention, it is preferred that the framework type of the zeolitic material having a framework type other than FER is CHA. It is more preferred that, in the framework structure of the zeolitic material having a framework type CHA, the molar ratio of silicon relative to aluminum, calculated as $SiO_2$:$Al_2O_3$, is more preferably in the range of from 5:1 to 30:1, more preferably in the range of from 6:1 to 9:1, more preferably in the range of from 7.5:1 to 8.5:1.

According to the first aspect, it is more preferred that, in the mixture prepared in (i) and subjected to (ii), in the zeolitic material having a framework type CHA, the molar ratio of silicon relative to alkali metal M, calculated as $SiO_2$:$M_2O$, is in the range of from 50:1 to 500:1, more preferably in the range of from 75:1 to 250:1, more preferably in the range of from 100:1 to 150:1.

Therefore, the first aspect of the present invention preferably relates to a process for preparing a zeolitic material having a framework type FER and having a framework structure comprising silicon, aluminum, and oxygen, said process comprising (i) preparing an aqueous synthesis mixture comprising water; a zeolitic material having a framework type CHA and having a framework structure comprising silicon, aluminum, and oxygen; a source of silicon other than the zeolitic material having a framework type CHA; an organic structure directing agent comprising piperidine; a source of an alkali metal; and a source of a base, wherein in the framework structure of the zeolitic material having a framework type CHA, the molar ratio of silicon relative to aluminum, calculated as $SiO_2:Al_2O_3$, is more preferably in the range of from 5:1 to 30:1, more preferably in the range of from 6:1 to 9:1, more preferably in the range of from 7.5:1 to 8.5:1;

(ii) subjecting the aqueous synthesis mixture prepared according to (i) to hydrothermal synthesis conditions comprising heating the synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER.

According to a second aspect of the present invention, it is preferred that, in the mixture prepared in (i) and subjected to (ii), the framework type of the zeolitic material having a framework type other than FER is FAU. As to the zeolitic material having a framework type FAU, it is preferred that it is one or more of a zeolite X and a zeolite Y, more preferably a zeolite Y.

According to the second aspect, it is preferred that, in the framework structure of the zeolitic material having a framework type FAU, the molar ratio of silicon relative to aluminum, calculated as $SiO_2:Al_2O_3$, is in the range of from 2:1 to 8:1, more preferably in the range of from 2:1 to 7:1, more preferably in the range of from 2:1 to 6:1.

According to the second aspect, in the mixture prepared in (i) and subjected to (ii), in the zeolitic material having a framework type FAU, it is preferred that the molar ratio of silicon relative to alkali metal M, calculated as $SiO_2:M_2O$, is in the range of from 1:1 to 8:1, more preferably in the range of from 1.5:1 to 7:1, more preferably in the range of from 2:1 to 6:1.

Therefore, the second aspect of the present invention preferably relates to a process for preparing a zeolitic material having a framework type FER and having a framework structure comprising silicon, aluminum, and oxygen, said process comprising (i) preparing an aqueous synthesis mixture comprising water; a zeolitic material having a framework type FAU, which is more preferably one or more of a zeolite X and a zeolite Y, more preferably a zeolite Y, and having a framework structure comprising silicon, aluminum, and oxygen; a source of silicon other than the zeolitic material having a framework type FAU; an organic structure directing agent comprising piperidine; a source of an alkali metal; and a source of a base, wherein in the framework structure of the zeolitic material having a framework type FAU, the molar ratio of silicon relative to aluminum, calculated as $SiO_2:Al_2O_3$, is more preferably in the range of from 2:1 to 8:1, more preferably in the range of from 2:1 to 7:1, more preferably in the range of from 2:1 to 6:1;

(ii) subjecting the aqueous synthesis mixture prepared according to (i) to hydrothermal synthesis conditions comprising heating the synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER.

According to a third aspect of the present invention, it is preferred that, in the mixture prepared in (i) and subjected to (ii), the framework type of the zeolitic material having a framework type other than FER is AEI, wherein in the framework structure of the zeolitic material having a framework type other than FER, the molar ratio of silicon relative to aluminum, calculated as $SiO_2:Al_2O_3$, more preferably is in the range of from 2:1 to 30:1, more preferably in the range of from 5:1 to 20:1, more preferably in the range of from 8:1 to 16:1, more preferably in the range of from 11:1 to 15:1.

According to the third aspect, it is preferred that, in the mixture prepared in (i) and subjected to (ii), in the zeolitic material having a framework type AEI, the molar ratio of silicon relative to alkali metal M, calculated as $SiO_2:M_2O$, is in the range of from 5:1 to 100:1, more preferably in the range of from 15:1 to 80:1, more preferably in the range of from 20:1 to 50:1, more preferably in the range of from 25:1 to 35:1.

Therefore, the third aspect of the present invention preferably relates to a process for preparing a zeolitic material having a framework type FER and having a framework structure comprising silicon, aluminum, and oxygen, said process comprising (i) preparing an aqueous synthesis mixture comprising water; a zeolitic material having a framework type AEI, and having a framework structure comprising silicon, aluminum, and oxygen; a source of silicon other than the zeolitic material having a framework type AEI; an organic structure directing agent comprising piperidine; a source of an alkali metal; and a source of a base, wherein in the framework structure of the zeolitic material having a framework type AEI, the molar ratio of silicon relative to aluminum, calculated as $SiO_2:Al_2O_3$, more preferably is in the range of from 2:1 to 30:1, more preferably in the range of from 5:1 to 20:1, more preferably in the range of from 8:1 to 16:1, more preferably in the range of from 11:1 to 15:1;

(ii) subjecting the aqueous synthesis mixture prepared according to (i) to hydrothermal synthesis conditions comprising heating the synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER.

According to a fourth aspect of the present invention, it is preferred that, in the mixture prepared in (i) and subjected to (ii), the framework type of the zeolitic material having a framework type other than FER is LEV, wherein in the framework structure of the zeolitic material having a framework type other than FER, the molar ratio of silicon relative to aluminum, calculated as $SiO_2:Al_2O_3$, more preferably is in the range of from 2:1 to 30:1, more preferably in the range of from 5:1 to 28:1, more preferably in the range of from 10:1 to 25:1, more preferably in the range of from 18:1 to 22:1.

According to the fourth aspect of the present invention, it is preferred that, in the mixture prepared in (i) and subjected to (ii), in the zeolitic material having a framework type LEV, the molar ratio of silicon relative to alkali metal M, calculated as $SiO_2:M_2O$, is in the range of from 50:1 to 500:1, preferably in the range of from 75:1 to 250:1, more preferably in the range of from 100:1 to 150:1.

Therefore, the fourth aspect of the present invention preferably relates to a process for preparing a zeolitic material having a framework type FER and having a framework structure comprising silicon, aluminum, and oxygen, said process comprising (i) preparing an aqueous synthesis mixture comprising water; a zeolitic material having a framework type LEV, and having a framework structure comprising silicon, aluminum, and oxygen; a source of silicon other than the zeolitic material having a framework type LEV; an organic structure directing agent comprising piperidine; a source of an alkali metal; and a source of a base, wherein in the framework structure of the zeolitic material having a framework type LEV, the molar ratio of silicon relative to aluminum, calculated as $SiO_2:Al_2O_3$, more preferably is in the range of from 2:1 to 30:1, more preferably in the range of from 5:1 to 28:1, more preferably in the range of from 10:1 to 25:1, more preferably in the range of from 18:1 to 22:1; (ii) subjecting the aqueous synthesis mixture prepared according to (i) to hydrothermal synthesis conditions comprising heating the synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER.

In the context of the present invention, it is preferred that, as to the mixture prepared in (i) and subjected to (ii), in the framework structure of the zeolitic material having a framework type other than FER, the molar ratio of silicon relative to aluminum, calculated as $SiO_2:Al_2O_3$, is in the range of from 2:1 to 22:1.

According to the present invention, it is preferred that, in the mixture prepared in (i) and subjected to (ii), the zeolitic material having a framework type other than FER has a BET specific surface area, determined as described in Reference Example 1 b), in the range of from 50 to 950 $m^2/g$, more preferably in the range of from 100 to 950 $m^2/g$.

As to the organic structure directing agent comprising piperidine used in the mixture prepared in (i) and subjected to (ii), there is no particular restriction provided that it permits to obtain a zeolitic material having a framework type FER. It is preferred that from 95 to 100 weight-%, more preferably from 98 to 100 weight-%, more preferably from 99 to 100 weight-% of the organic structure directing agent comprising piperidine consist of piperidine. It is more preferred that from 0 to 1 weight-%, more preferably from 0 to 0.5 weight-%, more preferably from 0 to 0.1 weight-% of the organic structure directing agent comprising piperidine consist of hexamethylene imine.

As to the organic structure agent comprised in the mixture prepared in (i) and subjected to (ii), it is preferred that it consists of piperidine.

Therefore, the present invention preferably relates to a process for preparing a zeolitic material having a framework type FER and having a framework structure comprising silicon, aluminum, and oxygen, said process comprising (i) preparing an aqueous synthesis mixture comprising water; a zeolitic material having a framework type other than FER and having a framework structure comprising silicon, aluminum, and oxygen; a source of silicon other than the zeolitic material having a framework type other than FER; an organic structure directing agent comprising piperidine; a source of an alkali metal; and a source of a base, wherein from 95 to 100 weight-%, more preferably from 98 to 100 weight-%, more preferably from 99 to 100 weight-% of the organic structure directing agent comprising piperidine consist of piperidine and wherein from 0 to 1 weight-%, more preferably from 0 to 0.5 weight-%, more preferably from 0 to 0.1 weight-% of the organic structure directing agent comprising piperidine consist of hexamethylene imine;

(ii) subjecting the aqueous synthesis mixture prepared according to (i) to hydrothermal synthesis conditions comprising heating the synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER.

As to the organic structure agent comprised in the mixture prepared in (i) and subjected to (ii), it is preferred that it does not contain hexamethylene imine.

As to the mixture prepared in (i) and subjected to (ii), it is preferred that the molar ratio of the silicon comprised in the zeolitic material having a framework type other than FER and in the source of silicon other than the zeolitic material having a framework type other than FER, relative to the organic structure directing agent, OSDA, calculated as $SiO_2$(source+zeolite):OSDA, is in the range of from 1:3 to 20:1. It is more preferred that the molar ratio of the silicon comprised in the zeolitic material having a framework type other than FER and in the source of silicon other than the zeolitic material having a framework type other than FER, relative to the organic structure directing agent, OSDA, calculated as $SiO_2$(source+zeolite):OSDA, is in the range of from 2:1 to 18:1, more preferably in the range of from 3:1 to 6:1. Alternatively, it is more preferred that the molar ratio of the silicon comprised in the zeolitic material having a framework type other than FER and in the source of silicon other than the zeolitic material having a framework type other than FER, relative to the organic structure directing agent, OSDA, calculated as $SiO_2$(source+zeolite):OSDA is in the range of from 1:2 to 1:1.

As to the mixture prepared in (i) and subjected to (ii), it is preferred that the source of silicon other than the zeolitic material having a framework type other than FER comprises, more preferably consists of, one or more of a silicate, a silica gel, a silica sol, and a silica powder, more preferably a silica gel.

More preferably, the silica gel, comprised in the mixture prepared in (i) and subjected to (ii), comprises, more preferably consists of, one or more of a solid silica gel and a colloidal silica. It is more preferred that the silica gel is a solid silica gel or a colloidal silica. As to the colloidal silica, it is preferred that it comprises, more preferably is, an ammonium stabilized aqueous colloidal silica. As to the solid silica gel comprised in the mixture prepared in (i) and subjected to (ii), it is preferred that it exhibits a molar ratio of (c $H_2O$):$SiO_2$ wherein c is a number in the range of from 0 to 2.5, more preferably in the range of from 0 to 2, more preferably in the range of from 0.5 to 1.75, more preferably in the range of from 1.0 to 1.5. As to the solid silica gel comprised in the mixture prepared in (i) and subjected to (ii), it is preferred that the solid silica gel is a silica gel as described in Reference Example 2.

It is preferred that the mixture prepared in (i) and subjected to (ii) comprises from 0 to 1 weight %, more preferably from 0 to 0.5 weight-%, more preferably from 0 to 0.01 weight-% of an aluminum source other than the zeolitic material having a framework type other than FER.

It is preferred that the mixture prepared in (i) and subjected to (ii) comprises no aluminum source other than the zeolitic material having a framework type other than FER.

As to the source of an alkali metal in the mixture prepared in (i) and subjected to (ii), it is preferred that it comprises, more preferably is, one or more of a source of sodium and a source of potassium, more preferably a source of sodium.

As to the source of a base in the mixture prepared in (i) and subjected to (ii), it is preferred that it is the source of an alkali metal, more preferably an alkali metal base, more preferably an alkali metal hydroxide, more preferably sodium hydroxide.

Therefore, the present invention preferably relates to a process for preparing a zeolitic material having a framework type FER and having a framework structure comprising silicon, aluminum, and oxygen, said process comprising (i) preparing an aqueous synthesis mixture comprising water; a zeolitic material having a framework type CHA and having a framework structure comprising silicon, aluminum, and oxygen; a source of silicon other than the zeolitic material having a framework type CHA; an organic structure directing agent comprising piperidine; sodium hydroxide;

(ii) subjecting the aqueous synthesis mixture prepared according to (i) to hydrothermal synthesis conditions comprising heating the synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER. Alternatively, it is preferred that the zeolitic material used in (i) is a zeolitic material having a framework type FAU or AEI or LEV.

According to the present invention, it is preferred that the weight ratio of the zeolitic material having a framework type other than FER relative to the source of a base, in the synthesis mixture prepared in (i) and subjected to (ii), is in the range of from 1:1 to 1:4, more preferably in the range of from 1:1 to 1:3, more preferably in the range of from 1:1 to 1:2.5.

It is preferred that from 95 to 100 weight-%, more preferably from 98 to 100 weight-%, more preferably from 99 to 100 weight-% of the mixture prepared in (i) and subjected to (ii) consist of water; the zeolitic material having a framework type other than FER and having a framework structure comprising silicon, aluminum, and oxygen; the source of silicon other than the zeolitic material having a framework type other than FER; the organic structure directing agent comprising piperidine; the source of an alkali metal; and the source of a base.

Preferably from 0 to 1 weight-%, more preferably from 0 to 0.5 weight-%, more preferably from 0 to 0.1 weight-% of the mixture prepared in (i) and subjected to (ii) consist of a zeolitic material having a framework type FER. Preferably the mixture prepared in (i) and subjected to (ii) does not contain a zeolitic material having a framework type FER.

It is preferred that the mixture prepared in (i) and subjected to (ii) consists of water; the zeolitic material having a framework type other than FER and having a framework structure comprising silicon, aluminum, and oxygen; the source of silicon other than the zeolitic material having a framework type other than FER; the organic structure directing agent comprising piperidine; the source of an alkali metal; and the source of a base.

As to the temperature of the mixture prepared in (i) and subjected to (ii), it is preferred that it is in the range of from 10 to 40° C., more preferably in the range of from 15 to 35° C., more preferably in the range of from 20 to 30° C.

As to preparing the mixture according to (i), it is preferred that (i) comprises (i.1) mixing water with the source of an alkali metal and the source of a base, obtaining a first mixture;

(i.2) adding the source of silicon other than the zeolitic material having a framework type other than FER to the first mixture, obtaining a second mixture;

(i.3) adding the zeolitic material having a framework type other than FER to the second mixture, obtaining a third mixture;

(i.4) adding the organic structure directing agent comprising piperidine to the third mixture, obtaining a fourth mixture. More preferably, the zeolitic material having a framework type other than FER is a zeolitic material having a framework type FAU, more preferably one or more of a zeolite Y and a zeolite X, more preferably a zeolite Y.

It is more preferred that, after (i.1) and before (i.2); and/or after (i.2) and before (i.3); and/or after (i.3) and before (i.4); and/or after (i.4), the respective mixture is stirred. More preferably, after (i.1) and before (i.2); and after (i.2) and before (i.3); and after (i.3) and before (i.4); and after (i.4), the respective mixture is stirred.

Alternatively, as to preparing the mixture according to (i), it is preferred that (i) comprises (i.1') mixing water with the source of an alkali metal and the source of a base, obtaining a first mixture;

(i.2') adding the organic structure directing agent comprising piperidine and the zeolitic material having a framework type other than FER to the first mixture, obtaining a second mixture;

(i.3') adding the source of silicon other than the zeolitic material having a framework type other than FER to the second mixture, obtaining a third mixture. More preferably, the zeolitic material having a framework type other than FER is a zeolitic material having a framework type CHA or AEI. Alternatively, the zeolitic material having a framework type other than FER more preferably is a zeolitic material having a framework type LEV.

It is more preferred that, after (i.1') and before (i.2'); and/or after (i.2') and before (i.3'); and/or after (i.3'), the respective mixture is stirred. More preferably, after (i.1') and before (i.2'); and after (i.2') and before (i.3'); and after (i.3'), the respective mixture is stirred.

Therefore, the present invention preferably relates to a process for preparing a zeolitic material having a framework type FER and having a framework structure comprising silicon, aluminum, and oxygen, said process comprising (i) preparing an aqueous synthesis mixture comprising water; a zeolitic material having a framework type CHA or FAU or LEV or AEI and having a framework structure comprising silicon, aluminum, and oxygen; a source of silicon other than the zeolitic material having a framework type CHA or FAU or LEV or AEI; an organic structure directing agent comprising piperidine; a source of an alkali metal; and a source of a base;

(ii) subjecting the aqueous synthesis mixture prepared according to (i) to hydrothermal synthesis conditions comprising heating the synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER;

wherein (i) comprises (i.1) mixing water with the source of an alkali metal and the source of a base, obtaining a first mixture;

(i.2) adding the source of silicon other than the zeolitic material having a framework type CHA or FAU or LEV or AEI to the first mixture, obtaining a second mixture;

(i.3) adding the zeolitic material having a framework type CHA or FAU or LEV or AEI to the second mixture, obtaining a third mixture;

(i.4) adding the organic structure directing agent comprising piperidine to the third mixture, obtaining a fourth mixture; or wherein (i) comprises (i.1') mixing water with the source of an alkali metal and the source of a base, obtaining a first mixture;

(i.2') adding the organic structure directing agent comprising piperidine and the zeolitic material having a framework type CHA or FAU or LEV or AEI to the first mixture, obtaining a second mixture;

(i.3') adding the source of silicon other than the zeolitic material having a framework type CHA or FAU or LEV or AEI to the second mixture, obtaining a third mixture.

As to (i.1) to (i.4) or to (i.1') to (i.3'), it is preferred that the temperature of the mixtures is in the range of from 10 to 40° C., more preferably in the range of from 15 to 35° C., more preferably in the range of from 20 to 30° C.

It is preferred that the fourth mixture obtained according to (i.4) or the third mixture obtained according (i.3'), more preferably after stirring as defined in the foregoing, is the mixture subjected to (ii).

According to (ii), it is preferred that the aqueous synthesis mixture is heated to a temperature in the range of from 150 to 190° C., more preferably in the range of from 160 to 180° C., more preferably in the range of from 165 to 175° C.

According to (ii), it is preferred that the aqueous synthesis mixture is heated to the temperature at a heating rate in the range of from 0.5 to 10 K/min.

During heating to the temperature according to (ii), it is preferred that the aqueous synthesis mixture is agitated, more preferably mechanically agitated. More preferably, during heating to the temperature according to (ii), the aqueous synthesis mixture is subjected to tumbling.

According to (ii), the aqueous synthesis mixture is preferably heated to the temperature in an autoclave, more preferably in the autoclave in which the hydrothermal crystallization according to (ii) is carried out.

According to (ii), the mixture is preferably kept at the temperature in this range under autogenous pressure for 54 to 120 h, more preferably for 57 to 96 h, more preferably for 60 to 84 h, more preferably for 66 to 78 h.

According to the present invention, it is preferred that the process further comprises (iii) cooling the mother liquor obtained from (ii), more preferably to a temperature in the range of from 10 to 50° C., more preferably in the range of from 20 to 35° C.

According to the present invention, it is preferred that the process further comprises (iv) separating the solid material from the mother liquor obtained from (ii) or (iii), more preferably from (iii).

As to the separating according to (iv), (iv) comprises (iv.1) subjecting the mother liquor obtained from (ii) or (iii), more preferably from (iii), to a solidliquid separation method, more preferably comprising centrifugation, filtration, or rapid-drying, more preferably filtration;

(iv.2) more preferably washing the solid material obtained from (iv.1);

(iv.3) more preferably drying the solid material obtained from (iv.1) or (iv.2), more preferably from (iv.2).

According to (iv.2), it is preferred that the solid material is washed with water, more preferably distilled water, more preferably until the washing water has a conductivity of at most 500 microSiemens, more preferably at most 200 microSiemens.

According to (iv.3), the solid material is preferably dried in a gas atmosphere having a temperature in the range of from 70 to 150° C., more preferably in the range of from 90 to 140° C., more preferably in the range of from 110 to 130° C. The gas atmosphere more preferably comprises one or more of oxygen and nitrogen, more preferably is air, lean air, or synthetic air The process according to the present invention preferably further comprises (v) calcining the solid material obtained from (iv).

Therefore, the present invention preferably relates to a process for preparing a zeolitic material having a framework type FER and having a framework structure comprising silicon, aluminum, and oxygen, said process comprising (i) preparing an aqueous synthesis mixture comprising water; a zeolitic material having a framework type other than FER and having a framework structure comprising silicon, aluminum, and oxygen; a source of silicon other than the zeolitic material having a framework type other than FER; an organic structure directing agent comprising piperidine; a source of an alkali metal; and a source of a base;

(ii) subjecting the aqueous synthesis mixture prepared according to (i) to hydrothermal synthesis conditions comprising heating the synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER;

(iii) more preferably cooling the mother liquor obtained from (ii), more preferably to a temperature in the range of from 10 to 50° C., more preferably in the range of from 20 to 35° C.; (iv) separating the solid material from the mother liquor obtained from (ii) or (iii), more preferably from (iii);

(v) calcining the solid material obtained from (iv).

According to (v), the solid material is preferably calcined in a gas atmosphere having a temperature in the range of from 450 to 650° C., more preferably in the range of from 500 to 600° C., more preferably in the range of from 525 to 575° C. The gas atmosphere more preferably comprises oxygen, more preferably is air, lean air, or synthetic air.

It is preferred that from 10 to 100 weight-%, more preferably from 20 to 100 weight-%, more preferably from 40 to 100 weight-%, more preferably from 60 to 100 weight-%, more preferably from 70 to 100 weight-%, more preferably from 80 to 100 weight-%, more preferably from 90 to 100 weight-% of the calcined solid material consist of the zeolitic material having a framework type FER.

It is preferred that the solid material further comprises one or more of a zeolitic material having a framework type MOR, a zeolitic material having a framework type MTN, a zeolitic material having a framework type MFI, a zeolitic material having a framework type FAU, and a zeolitic material having a framework type MTW.

It is preferred that the solid material further comprises one or more of a quartz, a cristobalite, and a magadite, more preferably one or more of a quartz and a cristobalite.

According to the present invention, it is preferred that the process further comprises (vi) subjecting the solid material obtained from (iv) or (v), more preferably from (iv.3) or (v), to ion-exchange conditions.

More preferably, (vi) comprises (vi.1) subjecting the solid material obtained from (iv) or (v), more preferably from (iv.3) or (v), to ion-exchange conditions comprising bringing a solution comprising ammonium ions in contact with the solid material obtained from (iv) or (v), obtaining a solid material in its ammonium form.

According to (vi.1) the solution comprising ammonium ions is preferably an aqueous solution comprising a dissolved ammonium salt, more preferably a dissolved inorganic ammonium salt.

The aqueous solution is more preferably a dissolved ammonium nitrate.

According to (vi.1) the solution comprising ammonium ions has preferably an ammonium concentration in the range of from 0.5 to 5 mol/l, more preferably in the range of from 1 to 4 mol/l, more preferably in the range of from 1 to 3 mol/l.

According to (vi.1), the solution comprising ammonium ions is preferably brought in contact with the solid material obtained from (iv) or (v) at a temperature of the solution in the range of from 40 to 100° C., more preferably in the range of from 60 to 90° C., more preferably in the range of from 70 to 90° C.

According to (vi.1), the solution comprising ammonium ions is preferably brought in contact with the solid material obtained from (iv) or (v) for a period of time in the range of from 0.5 to 8 hours, more preferably in the range of from 1 to 6 hours, more preferably in the range of from 1.5 to 4 hours.

According to (vi.1), it is preferred that bringing the solution in contact with the solid material comprises mixing the solid material with the solution comprising ammonium ions.

As to (vi), it is preferred that (vi) further comprises
(vi.2) optionally, drying the solid material obtained in (vi.1) in a gas atmosphere;
(vi.3) calcining the solid material obtained in (vi.1), or (vi.2), in a gas atmosphere, more preferably in a gas atmosphere having a temperature in the range of from 450 to 650° C., more preferably in the range of from 500 to 600° C., obtaining the H-form of the solid material.

According to (vi.2), drying is preferably performed in a gas atmosphere having a temperature in the range of from 90 to 200° C., more preferably in the range of from 100 to 150° C., more preferably in the range of from 110 to 130° C.

According to (vi.2), drying is preferably performed in a gas atmosphere for a duration in the range of from 0.5 to 5 hours, more preferably in the range of from 1 to 3 hours, more preferably in the range of from 1.5 to 2.5 hours.

As to (vi.2), the gas atmosphere preferably comprises oxygen, more preferably is air, lean air, or synthetic air.

According to (vi.3), calcining is preferably performed in gas atmosphere for a duration in the range of from 1 to 20 hours, more preferably in the range of from 2 to 10 hours, more preferably in the range of from 3 to 5 hours.

As to the N concentration in the calcined solid material obtained in (vi.3), it is preferred that it is in the range of from 0 to 0.01 wt. %, more preferably in the range of from 0 to 0.001 weight-%, more preferably 0.0001 weight-% based on the weight of the solid material.

It is preferred that (vi.1), optionally (vi.2), and (vi.3) are carried out at least once, more preferably twice.

As to (vi.3), the gas atmosphere preferably comprises oxygen, more preferably is air, lean air, or synthetic air.

According to the present invention, it is preferred that (vi) further comprises (vi.4) subjecting the solid material obtained in (vi.1) or (vi.3) to ion-exchange conditions comprising bringing a solution comprising ions of one or more transition metals. It is more preferred that the solution comprises ions of one or more of Cu, Pd, Rh, Pt and Fe, more preferably one or more of Cu, Pd and Fe, more preferably Cu.

According to (vi.4), the solution comprising ions of one or more transition metals is preferably an aqueous solution comprising a dissolved salt of one or more transition metals. The aqueous solution is more preferably a dissolved copper salt, more preferably a dissolved copper nitrate.

According to (vi.4), the ion-exchange conditions preferably comprise incipient wetness impregnation or aqueous ion-exchange.

According to the present invention, it is preferred that (vi) further comprises (vi.5) drying the solid material obtained in (vi.4) in a gas atmosphere, more preferably having a temperature in the range of from 90 to 200° C.

According to the present invention, it is preferred that (vi) further comprises (vi.6) calcining the solid material obtained in (vi.4), or in (vi.5), in a gas atmosphere, more preferably in a gas atmosphere having a temperature in the range of from 400 to 600° C.

According to (vi.6), the solid material obtained in (vi.4), or in (vi.5), is preferably calcined for a duration in the range of from 1 to 10 hours, more preferably in the range of from 3 to 7 hours.

As to (vi.5) and (iv.6), each independently, the gas atmosphere preferably comprises oxygen, more preferably is air, lean air, or synthetic air.

According to the present invention, it is preferred that the process further comprises (vi) subjecting the solid material obtained from (iv) or (v), more preferably from (iv.3) or (v), to ion-exchange conditions; wherein (vi) more preferably comprises
(vi.1) subjecting the solid material obtained from (iv) or (v), more preferably from (iv.3) or (v), to ion-exchange conditions comprising bringing a solution comprising ammonium ions in contact with the solid material obtained from (iv) or (v), obtaining a solid material in its ammonium form;
(vi.2) optionally, drying the solid material obtained in (vi.1) in a gas atmosphere;
(vi.3) more preferably calcining the solid material obtained in (vi.1), or (vi.2), in a gas atmosphere, more preferably in a gas atmosphere having a temperature in the range of from 450 to 650° C., more preferably in the range of from 500 to 600° C., obtaining the H-form of the solid material;
(vi.4) subjecting the solid material obtained in (vi.1) or (vi.3) to ion-exchange conditions comprising bringing a solution comprising ions of one or more transition metals, more preferably of one or more of Cu, Pd, Rh, Pt and Fe, more preferably one or more of Cu, Pd and Fe, more preferably Cu;
(vi.5) optionally, drying the solid material obtained in (vi.4) in a gas atmosphere, more preferably having a temperature in the range of from 90 to 200° C.;
(vi.6) calcining the solid material obtained in (vi.4), or in (vi.5), in a gas atmosphere, more preferably in a gas atmosphere having a temperature in the range of from 400 to 600° C.

The present invention further relates to a solid material comprising a zeolitic material having a framework type FER. The solid material is preferably obtainable or obtained by the process according to the present invention.

Preferably, the solid material further comprises one or more of a zeolitic material having a framework type MOR, a zeolitic material having a framework type MTN, a zeolitic material having a framework type MFI, a zeolitic material having a framework type FAU, and a zeolitic material having a framework type MTW, more preferably one or more of a zeolitic material having a framework type MOR, a zeolitic material having a framework type MFI and a zeolitic material having a framework type FAU.

Preferably, the solid material further comprises one or more of a quartz, a cristobalite and a magadite, more preferably one or more of a quartz and a cristobalite.

It is preferred that from 70 to 100 weight-%, more preferably from 80 to 100 weight-%, more preferably from 90 to 100 weight-%, more preferably from 98 to 100 weight-%, of the solid material consist of a zeolitic material having a framework type FER. It is more preferred that the solid material is a zeolitic material having a framework type FER.

It is also preferred that from 10 to 100 weight-%, more preferably from 20 to 100 weight-%, more preferably from 40 to 100 weight-%, more preferably from 60 to 100 weight-%, more preferably from 70 to 95 weight-%, more preferably from 80 to 95 weight-%, of the solid material consists of a zeolitic material having a framework type FER and from 0 to 90 weight-%, more preferably from 0 to 80 weight-%, more preferably from 0 to 60 weight-%, more preferably from 0 to 40 weight-%, more preferably from 5 to 30 weight-%, more preferably from 5 to 20 weight-% of the solid material consist of one or more of a quartz, a cristobalite and a magadite, or from 0 to 90 weight-%, more preferably from 0 to 80 weight-%, more preferably from 0 to 60 weight-%, more preferably from 0 to 40 weight-%, more preferably from 5 to 30 weight-%, more preferably from 5 to 20 weight-% of the solid material consist of one or more of a zeolitic material having a framework type MOR, a zeolitic material having a framework type MTN, a zeolitic material having a framework type MFI, a zeolitic material having a framework type FAU, and a zeolitic material having a framework type MTW.

According to the present invention, the solid material has preferably a BET specific surface area, determined as described in Reference Example 1 b), in the range of from 50 to 650 $m^2/g$, more preferably in the range of from 60 to 400 $m^2/g$. More preferably, the solid material has a BET specific surface area, determined as described in Reference Example 1 b), in the range of from 200 to 450 $m^2/g$, more preferably in the range of from 250 to 400 $m^2/g$, more preferably in the range of from 300 to 380 $m^2/g$.

It is preferred that the solid material has a molar ratio of silicon relative to aluminum, calculated as $SiO_2:Al_2O_3$, in the range of from 2:1 to 150:1, more preferably in the range of from 5:1 to 100:1. More preferably, the solid material has a molar ratio of silicon relative to aluminum, calculated as $SiO_2:Al_2O_3$, in the range of from 5:1 to 30:1, more preferably in the range of from 15:1 to 30:1. Alternatively, the solid material has more preferably a molar ratio of silicon relative to aluminum, calculated as $SiO_2:Al_2O_3$, in the range of from 40:1 to 100:1, more preferably in the range of from 60:1 to 95:1, more preferably in the range of from 70:1 to 90:1.

It is preferred that the solid material has a crystallinity, determined as described in Reference Example 1 c), of from 50 to 100%, more preferably of from 60 to 100%, more preferably of from 70 to 100%.

According to the present invention, it is preferred that the solid material has a micropore volume, determined as described in Reference Example 1 b), in the range of from 0.01 to 0.50 ml/g, more preferably in the range of from 0.02 to 0.30 ml/g, more preferably in the range of from 0.03 to 0.15 ml/g.

It is preferred that the solid material has a total acidity in the range of from 0.1 to 2.5 mmol/g, more preferably in the range of from 0.2 to 2.0 mmol/g, more preferably in the range of from 1.5 to 1.9 mmol/g or more preferably in the range of from 0.2 to 0.5 mmol/g.

It is preferred that the solid material described in the foregoing is obtainable or obtained by a process according to the present invention.

The present invention further relates to a use of a solid material according to the present invention as a catalytically active material, as a catalyst, or as a catalyst component. Preferably, the use is for selective catalytic reduction of nitrogen oxides in an exhaust gas stream of a diesel engine. Alternatively, the use is preferably for the isomerization of olefins, more preferably C4 olefins isomerization. As a further alternative, the use is preferably for the carbonylation of alcohols and/or ethers.

The present invention further relates to a method for selectively catalytically reducing nitrogen oxides in an exhaust gas stream of a diesel engine, said method comprising bringing said exhaust gas stream in contact with a solid material according to the present invention.

The present invention further relates to a method for the isomerization of olefins, preferably C4 olefins isomerization, said method comprising bringing said olefins in contact with a solid material according to the present invention.

The present invention further relates to a method for the carbonylation of alcohols and/or ethers, said method comprising bringing said alcohols and/or ethers in contact with a solid material according to the present invention.

The present invention further relates to an aqueous mixture comprising water; a zeolitic material having a framework type other than FER and having a framework structure comprising silicon, aluminum, and oxygen; a source of silicon other than the zeolitic material having a framework type other than FER; an organic structure directing agent comprising piperidine; a source of an alkali metal; and a source of a base, said aqueous mixture preferably being obtainable or obtained by a step (i) of a process according to the present invention.

The present invention further relates to a use of the aqueous mixture of the present invention for preparing a solid material comprising a zeolitic material having a framework type FER.

The present invention is further illustrated by the following embodiments and combinations of embodiments as indicated by the respective dependencies and back-references. In particular, it is noted that in each instance where a range of embodiments is mentioned, for example in the context of a term such as "The process of any one of embodiments 1 to 3", every embodiment in this range is meant to be explicitly disclosed for the skilled person, i.e. the wording of this term is to be understood by the skilled person as being synonymous to "The process of any one of embodiments 1, 2 and 3".

1. A process for preparing a zeolitic material having a framework type FER and having a framework structure comprising silicon, aluminum, and oxygen, said process comprising
   (i) preparing an aqueous synthesis mixture comprising water; a zeolitic material having a framework type other than FER and having a framework structure comprising silicon, aluminum, and oxygen; a source of silicon other than the zeolitic material having a framework type other than FER; an organic structure directing agent comprising piperidine; a source of an alkali metal; and a source of a base;
   (ii) subjecting the aqueous synthesis mixture prepared according to (i) to hydrothermal synthesis conditions comprising heating the synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER.

2. The process of embodiment 1, wherein in the mixture prepared in (i) and subjected to (ii), in the framework structure of the zeolitic material having a framework type other than FER, the molar ratio of silicon relative to aluminum, calculated as $SiO_2:Al_2O_3$, is in the range of from 2:1 to 40:1, preferably in the range of from 2:1 to 30:1.

3. The process of embodiment 1 or 2, wherein in the mixture prepared in (i) and subjected to (ii), from 95 to 100 weight-%, preferably from 98 to 100 weight-%, more preferably from 99 to 100 weight-% of the framework structure of the zeolitic material having a framework type other than FER consist of Si, Al, O, and optionally H.

4. The process of any one of embodiments 1 to 3, wherein in the mixture prepared in (i) and subjected to (ii), the zeolitic material having a framework type other than FER comprises an alkali metal M, preferably one or more of sodium and potassium, more preferably sodium.

5. The process of embodiment 4, wherein in the mixture prepared in (i) and subjected to (ii), in the zeolitic material having a framework type other than FER, the molar ratio of silicon relative to alkali metal M, calculated as $SiO_2:M_2O$, is in the range of from 1:1 to 500:1, preferably in the range of from 1:1 to 250:1, more preferably in the range of from 1:1 to 150:1.

6. The process of embodiment 4 or 5, wherein in the mixture prepared in (i) and subjected to (ii), from 95 to 100 weight-%, preferably from 98 to 100 weight-%, more preferably from 99 to 100 weight-% of the zeolitic material having a framework type other than FER consist of Si, Al, O, M, and optionally H.

7. The process of any one of embodiments 1 to 6, wherein in the mixture prepared in (i) and subjected to (ii), the framework type of the zeolitic material having a framework type other than FER is a framework type which is one or more of FAU, CHA, LEV and AEI, more preferably FAU or CHA or LEV or AEI.

8. The process of embodiment 7, wherein in the mixture prepared in (i) and subjected to (ii), the zeolitic material having a framework type FAU is one or more of a zeolite X and a zeolite Y, preferably a zeolite Y.

9. The process of any one of embodiments 1 to 7, wherein in the mixture prepared in (i) and subjected to (ii), the framework type of the zeolitic material having a framework type other than FER is CHA, wherein in the framework structure of the zeolitic material having a framework type other than FER, the molar ratio of silicon relative to aluminum, calculated as $SiO_2:Al_2O_3$, is preferably in the range of from 5:1 to 30:1, more preferably in the range of from 6:1 to 9:1, more preferably in the range of from 7.5:1 to 8.5:1;
wherein in the mixture prepared in (i) and subjected to (ii), in the zeolitic material having a framework type CHA, the molar ratio of silicon relative to alkali metal M, calculated as $SiO_2:M_2O$, preferably is in the range of from 50:1 to 500:1, more preferably in the range of from 75:1 to 250:1, more preferably in the range of from 100:1 to 150:1.

10. The process of any one of embodiments 1 to 8, wherein in the mixture prepared in (i) and subjected to (ii), the framework type of the zeolitic material having a framework type other than FER is FAU, wherein in the framework structure of the zeolitic material having a framework type other than FER, the molar ratio of silicon relative to aluminum, calculated as $SiO_2:Al_2O_3$, is preferably in the range of from 2:1 to 8:1, preferably in the range of from 2:1 to 7:1, more preferably in the range of from 2:1 to 6:1;
wherein in the mixture prepared in (i) and subjected to (ii), in the zeolitic material having a framework type FAU, the molar ratio of silicon relative to alkali metal M, calculated as $SiO_2:M_2O$, preferably is in the range of from 1:1 to 8:1, more preferably in the range of from 1.5:1 to 7:1, more preferably in the range of from 2:1 to 6:1.

11. The process of any one of embodiments 1 to 7, wherein in the mixture prepared in (i) and subjected to (ii), the framework type of the zeolitic material having a framework type other than FER is AEI, wherein in the framework structure of the zeolitic material having a framework type other than FER, the molar ratio of silicon relative to aluminum, calculated as $SiO_2:Al_2O_3$, is preferably in the range of from 2:1 to 30:1, preferably in the range of from 5:1 to 20:1, more preferably in the range of from 8:1 to 16:1, more preferably in the range of from 11:1 to 15:1;
wherein more preferably in the mixture prepared in (i) and subjected to (ii), in the zeolitic material having a framework type AEI, the molar ratio of silicon relative to alkali metal M, calculated as $SiO_2:M_2O$, is in the range of from 5:1 to 100:1, preferably in the range of from 15:1 to 80:1, more preferably in the range of from 20:1 to 50:1, more preferably in the range of from 25:1 to 35:1.

12. The process of any one of embodiments 1 to 7, wherein in the mixture prepared in (i) and subjected to (ii), the framework type of the zeolitic material having a framework type other than FER is LEV, wherein in the framework structure of the zeolitic material having a framework type other than FER, the molar ratio of silicon relative to aluminum, calculated as $SiO_2:Al_2O_3$, is preferably in the range of from 2:1 to 30:1, preferably in the range of from 5:1 to 28:1, more preferably in the range of from 10:1 to 25:1, more preferably in the range of from 18:1 to 22:1;
wherein more preferably in the mixture prepared in (i) and subjected to (ii), in the zeolitic material having a framework type LEV, the molar ratio of silicon relative to alkali metal M, calculated as $SiO_2:M_2O$, is in the range of from 50:1 to 500:1, preferably in the range of from 75:1 to 250:1, more preferably in the range of from 100:1 to 150:1.

13. The process of any one of embodiments 1 to 12, wherein in the mixture prepared in (i) and subjected to (ii), the zeolitic material having a framework type other than FER has a BET specific surface area, determined as described in Reference Example 1 b), in the range of from 50 to 950 $m^2/g$, preferably in the range of from 100 to 950 $m^2/g$.

14. The process of any one of embodiments 1 to 13, wherein in the mixture prepared in (i) and subjected to (ii), from 95 to 100 weight-%, preferably from 98 to 100 weight-%, more preferably from 99 to 100 weight-% of the organic structure directing agent comprising piperidine consist of piperidine, wherein preferably from 0 to 1 weight-%, more preferably from 0 to 0.5 weight-%, more preferably from 0 to 0.1 weight-% of the organic structure directing agent comprising piperidine consist of hexamethylene imine.

15. The process of embodiment 14, wherein in the mixture prepared in (i) and subjected to (ii), the organic structure directing agent consists of piperidine, wherein in the mixture prepared in (i) and subjected to (ii), the organic structure directing agent preferably does not contain hexamethylene imine.

16. The process of any one of embodiments 1 to 15, wherein in the mixture prepared in (i) and subjected to (ii), the molar ratio of the silicon comprised in the zeolitic material having a framework type other than FER and in the source of silicon other than the zeolitic material having a framework type other than FER, relative to the organic structure directing agent, OSDA, calculated as $SiO_2$ (source+zeolite):OSDA, is in the range of from 1:3 to 20:1;

wherein in the mixture prepared in (i) and subjected to (ii), the molar ratio of the silicon comprised in the zeolitic material having a framework type other than FER and in the source of silicon other than the zeolitic material having a framework type other than FER, relative to the organic structure directing agent, OSDA, calculated as $SiO_2$(source+zeolite):OSDA, more preferably is in the range of from in the range of from 2:1 to 18:1, more preferably in the range of from 3:1 to 6:1; or in the range of from 1:3 to 1.1.

17. The process of any one of embodiments 1 to 16, wherein in the mixture prepared in (i) and subjected to (ii), the source of silicon other than the zeolitic material having a framework type other than FER comprises, preferably consists of, one or more of a silicate, a silica gel, a silica sol, and a silica powder, preferably a silica gel.

18. The process of embodiment 17, wherein in the mixture prepared in (i) and subjected to (ii), the silica gel comprises, preferably consists of, one or more of a solid silica gel and a colloidal silica, preferably a solid silica gel or a colloidal silica.

19. The process of embodiment 18, wherein in the mixture prepared in (i) and subjected to (ii), the colloidal silica comprises, preferably is, an ammonium stabilized aqueous colloidal silica.

20. The process of embodiment 18, wherein in the mixture prepared in (i) and subjected to (ii), the solid silica gel exhibits a molar ratio of (c $H_2O$):$SiO_2$ wherein c is a number in the range of from 0 to 2.5, preferably in the range of from 0 to 2, more preferably in the range of from 0.5 to 1.75, more preferably in the range of from 1.0 to 1.5.

21. The process of embodiment 20, wherein in the mixture prepared in (i) and subjected to (ii), the solid silica gel is a silica gel as described in Reference Example 2.

22. The process of any one of embodiments 1 to 21, wherein the mixture prepared in (i) and subjected to (ii), comprises from 0 to 1 weight-%, preferably from 0 to 0.5 weight-%, more preferably from 0 to 0.01 weight-% of an aluminum source other than the zeolitic material having a framework type other than FER.

23. The process of any one of embodiments 1 to 22, wherein the mixture prepared in (i) and subjected to (ii), comprises no aluminum source other than the zeolitic material having a framework type other than FER.

24. The process of any one of embodiments 1 to 23, wherein in the mixture prepared in (i) and subjected to (ii), the source of an alkali metal comprises, preferably is, one or more of a source of sodium and a source of potassium, more preferably a source of sodium.

25. The process of any one of embodiments 1 to 24, wherein in the mixture prepared in (i) and subjected to (ii), the source of a base is the source of an alkali metal, preferably an alkali metal base, more preferably an alkali metal hydroxide, more preferably sodium hydroxide.

26. The process of any one of embodiments 1 to 25, wherein in the synthesis mixture prepared in (i) and subjected to (ii), the weight ratio of the zeolitic material having a framework type other than FER relative to the source of a base is in the range of from 1:1 to 1:4, preferably in the range of from 1:1 to 1:3, more preferably in the range of from 1:1 to 1:2.5.

27. The process of any one of embodiments 1 to 26, wherein from 95 to 100 weight-%, preferably from 98 to 100 weight-%, more preferably from 99 to 100 weight-% of the mixture prepared in (i) and subjected to (ii) consist of water; the zeolitic material having a framework type other than FER and having a framework structure comprising silicon, aluminum, and oxygen; the source of silicon other than the zeolitic material having a framework type other than FER; the organic structure directing agent comprising piperidine; the source of an alkali metal; and the source of a base.

28. The process of any one of embodiments 1 to 27, wherein from 0 to 1 weight-%, preferably from 0 to 0.5 weight-%, more preferably from 0 to 0.1 weight-% of the mixture prepared in (i) and subjected to (ii) consist of a zeolitic material having a framework type FER.

29. The process of any one of embodiments 1 to 28, wherein the mixture prepared in (i) and subjected to (ii) does not contain a zeolitic material having a framework type FER.

30. The process of any one of embodiments 1 to 29, wherein the mixture prepared in (i) and subjected to (ii) consists of water; the zeolitic material having a framework type other than FER and having a framework structure comprising silicon, aluminum, and oxygen; the source of silicon other than the zeolitic material having a framework type other than FER; the organic structure directing agent comprising piperidine; the source of an alkali metal; and the source of a base.

31. The process of any one of embodiments 1 to 30, wherein the temperature of the mixture prepared in (i) and subjected to (ii) is in the range of from 10 to 40° C., preferably in the range of from 15 to 35° C., more preferably in the range of from 20 to 30° C.

32. The process of any one of embodiments 1 to 31, wherein preparing the mixture according to (i) comprises
    (i.1) mixing water with the source of an alkali metal and the source of a base, obtaining a first mixture;
    (i.2) adding the source of silicon other than the zeolitic material having a framework type other than FER to the first mixture, obtaining a second mixture;
    (i.3) adding the zeolitic material having a framework type other than FER to the second mixture, obtaining a third mixture;
    (i.4) adding the organic structure directing agent comprising piperidine to the third mixture, obtaining a fourth mixture.

33. The process of embodiment 32, wherein, after (i.1) and before (i.2); and/or after (i.2) and before (i.3); and/or after (i.3) and before (i.4); and/or after (i.4), the respective mixture is stirred, wherein preferably, after (i.1) and before (i.2); and after (i.2) and before (i.3); and after (i.3) and before (i.4); and after (i.4), the respective mixture is stirred.

34. The process of any one of embodiments 1 to 31, wherein preparing the mixture according to (i) comprises
    (i.1') mixing water with the source of an alkali metal and the source of a base, obtaining a first mixture;
    (i.2') adding the organic structure directing agent comprising piperidine and the zeolitic material having a framework type other than FER to the first mixture, obtaining a second mixture;
    (i.3') adding the source of silicon other than the zeolitic material having a framework type other than FER to the second mixture, obtaining a third mixture.

35. The process of embodiment 34, wherein, after (i.1') and before (i.2'); and/or after (i.2') and before (i.3'); and/or after (i.3'), the respective mixture is stirred, wherein preferably, after (i.1') and before (i.2'); and after (i.2') and before (i.3'); and after (i.3'), the respective mixture is stirred.

36. The process of any one of embodiments 32 to 35, wherein the temperature of the mixtures is in the range of from 10 to 40° C., preferably in the range of from 15 to 35° C., more preferably in the range of from 20 to 30° C.
37. The process of any one of embodiments 32 to 36, wherein the fourth mixture obtained according to (i.4) or the third mixture obtained according (i.3'), preferably after stirring as defined in embodiment 33 or 35, is the mixture subjected to (ii).
38. The process of any one of embodiments 1 to 37, wherein according to (ii), the aqueous synthesis mixture is heated to a temperature in the range of from 150 to 190° C., preferably in the range of from 160 to 180° C., more preferably in the range of from 165 to 175° C.
39. The process of any one of embodiments 1 to 38, wherein according to (ii), the aqueous synthesis mixture is heated to the temperature at a heating rate in the range of from 0.5 to 10 K/min.
40. The process of any one of embodiments 1 to 39, wherein during heating to the temperature according to (ii), the aqueous synthesis mixture is agitated, preferably mechanically agitated.
41. The process of embodiment 40, wherein during heating to the temperature according to (ii), the aqueous synthesis mixture is subjected to tumbling.
42. The process of any one of embodiments 1 to 41, wherein according to (ii), the aqueous synthesis mixture is heated to the temperature in an autoclave, preferably in the autoclave in which the hydrothermal crystallization according to (ii) is carried out.
43. The process of any one of embodiments 1 to 42, wherein according to (ii), the mixture is kept at the temperature in this range under autogenous pressure for 54 to 120 h, preferably for 57 to 96 h, more preferably for 60 to 84 h, more preferably for 66 to 78 h.
44. The process of any one of embodiments 1 to 43, further comprising
    (iii) cooling the mother liquor obtained from (ii), preferably to a temperature in the range of from 10 to 50° C., more preferably in the range of from 20 to 35° C.
45. The process of any one of embodiments 1 to 44, further comprising
    (iv) separating the solid material from the mother liquor obtained from (ii) or (iii), preferably from (iii).
46. The process of embodiment 45, wherein the separating according to (iv) comprises
    (iv.1) subjecting the mother liquor obtained from (ii) or (iii), preferably from (iii), to a sok id-liquid separation method, preferably comprising centrifugation, filtration, or rapid-drying, preferably filtration;
    (iv.2) preferably washing the solid material obtained from (iv.1);
    (iv.3) preferably drying the solid material obtained from (iv.1) or (iv.2), more preferably from (iv.2).
47. The process of embodiment 46, wherein according to (iv.2), the solid material is washed with water, preferably distilled water, preferably until the washing water has a conductivity of at most 500 microSiemens, more preferably at most 200 microSiemens.
48. The process of embodiment 46 or 47, wherein according to (iv.3), the solid material is dried in a gas atmosphere having a temperature in the range of from 70 to 150° C., preferably in the range of from 90 to 140° C., more preferably in the range of from 110 to 130° C.
49. The process of embodiment 48, wherein the gas atmosphere comprises one or more of oxygen and nitrogen, preferably is air, lean air, or synthetic air.
50. The process of any one of embodiments 45 to 49, further comprising
    (v) calcining the solid material obtained from (iv).
51. The process of embodiment 50, wherein according to (v), the solid material is calcined in a gas atmosphere having a temperature in the range of from 450 to 650° C., preferably in the range of from 500 to 600° C., more preferably in the range of from 525 to 575° C.
52. The process of embodiment 51, wherein the gas atmosphere comprises oxygen, preferably is air, lean air, or synthetic air.
53. The process of any one of embodiments 1 to 52, wherein from 10 to 100 weight-%, preferably from 20 to 100 weight-%, more preferably from 40 to 100 weight-%, more preferably from 60 to 100 weight-%, more preferably from 70 to 100 weight-%, more preferably from 80 to 100 weight-%, more preferably from 90 to 100 weight-% of the calcined solid material consist of the zeolitic material having a framework type FER.
54. The process of any one of embodiments 1 to 53, preferably embodiment 53, wherein the solid material further comprises one or more of a zeolitic material having a framework type MOR, a zeolitic material having a framework type MTN, a zeolitic material having a framework type MFI, a zeolitic material having a framework type FAU, and a zeolitic material having a framework type MTW.
55. The process of any one of embodiments 1 to 54, preferably embodiment 53 or 54, wherein the solid material further comprises one or more of a quartz, a cristobalite, and a magadite, preferably one or more of a quartz and a cristobalite.
56. The process of any one of embodiments 45 to 55 further comprising
    (vi) subjecting the solid material obtained from (iv) or (v), preferably from (iv.3) or (v), to ion-exchange conditions.
57. The process of embodiment 56, wherein (vi) comprises
    (vi.1) subjecting the solid material obtained from (iv) or (v), preferably from (iv.3) or (v), to ion-exchange conditions comprising bringing a solution comprising ammonium ions in contact with the solid material obtained from (iv) or (v), obtaining a solid material in its ammonium form.
58. The process of embodiment 57, wherein the solution comprising ammonium ions according to (vi.1) is an aqueous solution comprising a dissolved ammonium salt, preferably a dissolved inorganic ammonium salt, more preferably a dissolved ammonium nitrate.
59. The process of embodiment 57 or 58, wherein the solution comprising ammonium ions according to (vi.1) has an ammonium concentration in the range of from 0.5 to 5 mol/l, preferably in the range of from 1 to 4 mol/l, more preferably in the range of from 1 to 3 mol/l.
60. The process of any one of embodiments 57 to 59, wherein according to (vi.1), the solution comprising ammonium ions is brought in contact with the solid material obtained from (iv) or (v) at a temperature of the solution in the range of from 40 to 100° C., preferably in the range of from 60 to 90° C., more preferably in the range of from 70 to 90° C.
61. The process of any one of embodiments 57 to 60, wherein according to (vi.1), the solution comprising ammonium ions is brought in contact with the solid material obtained from (iv) or (v) for a period of time in the range of from 0.5 to 8 hours, preferably in the range of from 1 to 6 hours, more preferably in the range of from 1.5 to 4 hours.

62. The process of any one of embodiments 57 to 61, wherein bringing the solution in contact with the solid material according to (vi.1) comprises mixing the solid material with the solution comprising ammonium ions.

63. The process of any one of embodiments 57 to 62, wherein (vi) further comprises (vi.2) optionally, drying the solid material obtained in (vi.1) in a gas atmosphere; (vi.3) calcining the solid material obtained in (vi.1), or (vi.2), in a gas atmosphere, preferably in a gas atmosphere having a temperature in the range of from 450 to 650° C., more preferably in the range of from 500 to 600° C., obtaining the H-form of the solid material.

64. The process of embodiment 63, wherein drying according to (vi.2) is performed in a gas atmosphere having a temperature in the range of from 90 to 200° C., preferably in the range of from 100 to 150° C., more preferably in the range of from 110 to 130° C.

65. The process of embodiment 63 or 64, wherein drying according to (vi.2) is performed in a gas atmosphere for a duration in the range of from 0.5 to 5 hours, preferably in the range of from 1 to 3 hours, more preferably in the range of from 1.5 to 2.5 hours.

66. The process of any one of embodiments 63 to 65, wherein in (vi.2), the gas atmosphere comprises oxygen, preferably is air, lean air, or synthetic air.

67. The process of any one of embodiments 63 to 66, wherein calcining according to (vi.3) is performed in gas atmosphere for a duration in the range of from 1 to 20 hours, preferably in the range of from 2 to 10 hours, more preferably in the range of from 3 to 5 hours.

68. The process of any one of embodiments 63 to 67, wherein the N concentration in the calcined solid material obtained in (vi.3) is in the range of from 0 to 0.01 wt. %, preferably in the range of from 0 to 0.001 weight-%, more preferably 0.0001 weight-% based on the weight of the solid material.

69. The process of any one of embodiments 63 to 68, wherein (vi.1), optionally (vi.2), and (vi.3) are carried out at least once, preferably twice.

70. The process of any one of embodiments 63 to 69, wherein in (vi.3) the gas atmosphere comprises oxygen, preferably is air, lean air, or synthetic air.

71. The process of any one of embodiments 57 to 70, wherein (vi) further comprises (vi.4) subjecting the solid material obtained in (vi.1) or (vi.3) to ion-exchange conditions comprising bringing a solution comprising ions of one or more transition metals, preferably of one or more of Cu, Pd, Rh, Pt and Fe, more preferably one or more of Cu, Pd and Fe, more preferably Cu.

72. The process of embodiment 71, wherein the solution comprising ions of one or more transition metals according to (vi.4) is an aqueous solution comprising a dissolved salt of one or more transition metals, preferably a dissolved copper salt, more preferably a dissolved copper nitrate.

73. The process of embodiment 71 or 72, wherein according to (vi.4), the ion-exchange conditions comprise incipient wetness impregnation or aqueous ion-exchange.

74. The process of any one of embodiments 71 to 73, wherein (vi) further comprises (vi.5) drying the solid material obtained in (vi.4) in a gas atmosphere, preferably having a temperature in the range of from 90 to 200° C.

75. The process of any one of embodiments 71 to 74, wherein (vi) further comprises (vi.6) calcining the solid material obtained in (vi.4), or in (vi.5), in a gas atmosphere, preferably in a gas atmosphere having a temperature in the range of from 400 to 600° C.

76. The process of embodiment 75, wherein according to (vi.6), the solid material obtained in (vi.4), or in (vi.5), is calcined for a duration in the range of from 1 to 10 hours, preferably in the range of from 3 to 7 hours.

77. The process of embodiment 76, wherein in (vi.5) and in (iv.6), each independently, the gas atmosphere comprises oxygen, preferably is air, lean air, or synthetic air.

78. A solid material comprising a zeolitic material having a framework type FER, obtainable or obtained by a process according to any one of embodiments 1 to 77, preferably according to any one of embodiments 45 to 55, more preferably according to any one of embodiments 50 to 55.

79. The solid material of embodiment 78, further comprising one or more of a zeolitic material having a framework type MOR, a zeolitic material having a framework type MTN, a zeolitic material having a framework type MFI, a zeolitic material having a framework type FAU, and a zeolitic material having a framework type MTW, preferably one or more of a zeolitic material having a framework type MOR, a zeolitic material having a framework type MFI and a zeolitic material having a framework type FAU.

80. The solid material of embodiment 78 or 79, further comprising one or more of a quartz, a cristobalite and a magadite, preferably one or more of a quartz and a cristobalite.

81. The solid material of any one of embodiments 78 to 80, wherein from 70 to 100 weight-%, preferably from 80 to 100 weight-%, more preferably from 90 to 100 weight-%, more preferably from 98 to 100 weight-%, of the solid material consist of a zeolitic material having a framework type FER.

82. The solid material of any one of embodiments 78 to 80, wherein from 10 to 100 weight-%, preferably from 20 to 100 weight-%, more preferably from 40 to 100 weight-%, more preferably from 60 to 100 weight-%, more preferably from 70 to 95 weight-%, more preferably from 80 to 95 weight-%, of the solid material consists of a zeolitic material having a framework type FER and from 0 to 90 weight-%, preferably from 0 to 80 weight-%, more preferably from 0 to 60 weight-%, more preferably from 0 to 40 weight-%, more preferably from 5 to 30 weight-%, more preferably from 5 to 20 weight-% of the solid material consist of one or more of a quartz, a cristobalite and a magadite, or from 0 to 90 weight-%, preferably from 0 to 80 weight-%, more preferably from 0 to 60 weight-%, more preferably from 0 to 40 weight-%, more preferably from 5 to 30 weight-%, more preferably from 5 to 20 weight-% of the solid material consist of one or more of a zeolitic material having a framework type MOR, a zeolitic material having a framework type MTN, a zeolitic material having a framework type MFI, a zeolitic material having a framework type FAU, and a zeolitic material having a framework type MTW.

83. The solid material of any one of embodiments 78 to 82, having a BET specific surface area, determined as described in Reference Example 1 b), in the range of from 50 to 650 m$^2$/g, preferably in the range of from 60 to 400 m$^2$/g.

84. The solid material of embodiment 83, having a BET specific surface area, determined as described in Reference Example 1 b), in the range of from 200 to 450 m$^2$/g, preferably in the range of from 250 to 400 m$^2$/g, more preferably in the range of from 300 to 380 m$^2$/g.

85. The solid material of any one of embodiments 78 to 84, having a molar ratio of silicon relative to aluminum, calculated as $SiO_2:Al_2O_3$, in the range of from 2:1 to 150:1, preferably in the range of from 5:1 to 100:1, more preferably in the range of from 5:1 to 40:1.
86. The solid material of embodiment 85, having a molar ratio of silicon relative to aluminum, calculated as $SiO_2:Al_2O_3$, in the range of from 5:1 to 30:1, preferably in the range of from 8:1 to 20:1, more preferably in the range of from 10:1 to 19:1, more preferably in the range of from 15:1 to 18:1, or preferably in the range of from 20:1 to 30:1.
87. The solid material of embodiment 85, having a molar ratio of silicon relative to aluminum, calculated as $SiO_2:Al_2O_3$, in the range of from 40:1 to 100:1, preferably in the range of from 60:1 to 95:1, more preferably in the range of from 70:1 to 90:1.
88. The solid material of any one of embodiments 78 to 87, having a crystallinity, determined as described in Reference Example 1 c), of from 50 to 100%, preferably of from 60 to 100%, more preferably of from 70 to 100%.
89. The solid material of any one of embodiments 78 to 88, preferably obtainable or obtained by a process according to any one of embodiments 56 to 70, having a micropore volume, determined as described in Reference Example 1 b), in the range of from 0.01 to 0.50 ml/g, preferably in the range of from 0.02 to 0.30 ml/g, more preferably in the range of from 0.03 to 0.15 ml/g.
90. The solid material of any one of embodiments 78 to 89, preferably obtainable or obtained by a process according to any one of embodiments 56 to 70, having a total acidity in the range of from 0.1 to 2.5 mmol/g, preferably in the range of from 0.2 to 2.0 mmol/g, more preferably in the range of from 1.5 to 1.9 mmol/g or more preferably in the range of from 0.2 to 0.5 mmol/g.
91. A solid material comprising a zeolitic material having a framework type FER, preferably the solid material according to any one of embodiments 78 to 90.
92. The solid material of embodiment 91, further comprising one or more of a zeolitic material having a framework type MOR, a zeolitic material having a framework type MTN, a zeolitic material having a framework type MFI, a zeolitic material having a framework type FAU, and a zeolitic material having a framework type MTW, preferably one or more of a zeolitic material having a framework type MOR, a zeolitic material having a framework type MFI and a zeolitic material having a framework type FAU.
93. The solid material of embodiment 91 or 92, further comprising one or more of a quartz, a cristobalite and a magadite, preferably one or more of a quartz and a cristoballite.
94. The solid material of any one of embodiments 91 to 93, wherein from 70 to 100 weight-%, preferably from 80 to 100 weight-%, more preferably from 90 to 100 weight-%, more preferably from 98 to 100 weight-%, of the solid material consist of a zeolitic material having a framework type FER.
95. The solid material of any one of embodiments 91 to 93, wherein from 10 to 100 weight-%, preferably from 20 to 100 weight-%, more preferably from 40 to 100 weight-%, more preferably from 60 to 100 weight-%, more preferably from 70 to 95 weight-%, more preferably from 80 to 95 weight-%, of the solid material consists of a zeolitic material having a framework type FER and from 0 to 90 weight-%, preferably from 0 to 80 weight-%, more preferably from 0 to 60 weight-%, more preferably from 0 to 40 weight-%, more preferably from 5 to 30 weight-%, more preferably from 5 to 20 weight-% of the solid material consist of one or more of a quartz, a cristobalite and a magadite, or from 0 to 90 weight-%, preferably from 0 to 80 weight-%, more preferably from 0 to 60 weight-%, more preferably from 0 to 40 weight-%, more preferably from 5 to 30 weight-%, more preferably from 5 to 20 weight-% of the solid material consist of one or more of a zeolitic material having a framework type MOR, a zeolitic material having a framework type MTN, a zeolitic material having a framework type MFI, a zeolitic material having a framework type FAU, and a zeolitic material having a framework type MTW.
96. The solid material of any one of embodiments 91 to 95 having a BET specific surface area, determined as described in Reference Example 1 b), in the range of from 50 to 650 $m^2/g$, preferably in the range of from 60 to 400 $m^2/g$.
97. The solid material of embodiment 96, having a BET specific surface area, determined as described in Reference Example 1 b), in the range of from 200 to 450 $m^2/g$, preferably in the range of from 250 to 400 $m^2/g$, more preferably in the range of from 300 to 380 $m^2/g$.
98. The solid material of any one of embodiments 91 to 97, having a molar ratio of silicon relative to aluminum, calculated as $SiO_2:Al_2O_3$, in the range of from 2:1 to 150:1, preferably in the range of from 5:1 to 100:1, more preferably in the range of from 5:1 to 40:1.
99. The solid material of embodiment 98, having a molar ratio of silicon relative to aluminum, calculated as $SiO_2:Al_2O_3$, in the range of from 5:1 to 30:1, preferably in the range of from 8:1 to 20:1, more preferably in the range of from 10:1 to 19:1, more preferably in the range of from 15:1 to 18:1, or preferably in the range of from 20:1 to 30:1.
100. The solid material of embodiment 98, having a molar ratio of silicon relative to aluminum, calculated as $SiO_2:Al_2O_3$, in the range of from 40:1 to 100:1, preferably in the range of from 60:1 to 95:1, more preferably in the range of from 70:1 to 90:1.
101. The solid material of any one of embodiments 91 to 100, having a crystallinity, determined as described in Reference Example 1 c), of from 50 to 100%, preferably of from 60 to 100%, more preferably of from 70 to 100%.
102. The solid material of any one of embodiments 91 to 101, having a micropore volume, determined as described in Reference Example 1 b), in the range of from 0.01 to 0.50 ml/g, preferably in the range of from 0.02 to 0.30 ml/g, more preferably in the range of from 0.03 to 0.15 ml/g.
103. The solid material of any one of embodiments 91 to 102, having a total acidity in the range of from 0.1 to 2.5 mmol/g, preferably in the range of from 0.2 to 2.0 mmol/g, more preferably in the range of from 1.5 to 1.9 mmol/g or more preferably in the range of from 0.2 to 0.5 mmol/g.
104. Use of a solid material according to any one of embodiments 78 to 103 as a catalytically active material, as a catalyst, or as a catalyst component.
105. The use of embodiment 104, for selective catalytic reduction of nitrogen oxides in an exhaust gas stream of a diesel engine.
106. The use of embodiment 104, for the isomerization of olefins, preferably C4 olefins isomerization.
107. The use of embodiment 104, for the carbonylation of alcohols and/or ethers.

108. A method for selectively catalytically reducing nitrogen oxides in an exhaust gas stream of a diesel engine, said method comprising bringing said exhaust gas stream in contact with a solid material according to any one of embodiments 78 to 103.
109. A method for the isomerization of olefins, preferably C4 olefins isomerization, said method comprising bringing said olefins in contact with a solid material according to any one of embodiments 78 to 103.
110. A method for the carbonylation of alcohols and/or ethers, said method comprising bringing said alcohols and/or ethers in contact with a solid material according to any one of embodiments 78 to 103.
111. An aqueous mixture comprising water; a zeolitic material having a framework type other than FER and having a framework structure comprising silicon, aluminum, and oxygen; a source of silicon other than the zeolitic material having a framework type other than FER; an organic structure directing agent comprising piperidine; a source of an alkali metal; and a source of a base, said aqueous mixture preferably being obtainable or obtained by a step (i) of a process according to any one of embodiments 1 to 77.
112. Use of the aqueous mixture of embodiment 111 for preparing a solid material comprising a zeolitic material having a framework type FER.

In the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

The present invention is further illustrated by the following Reference Examples, Comparative Examples, and Examples.

EXAMPLES

Reference Example 1: Characterizations a) X-ray powder diffraction (XRD) patterns were measured with Rigaku Ultimate VI X-ray diffractometer (40 kV, 40 mA) using $C_{U_{Kalpha}}$ radiation (lambda=1.5406 Angstrom).
b) The $N_2$ sorption isotherms at the temperature of liquid nitrogen were measured using Micromeritics ASAP 2020M and Tristar system for determining the BET specific surface area. The micropore volume was measured by BJH (Barett, Joyner, Halenda) analysis according to DIN 66134.
c) The crystallinity was determined by X-ray powder diffraction analysis. Computing angles and intensities: To compute angles and intensities the peak search algorithm as it is implemented within the software DIFRAC.EVA provided by Bruker AXS GmbH was used. After that a manual check of the detected intensities to delete spurious peaks and correct the peak position was performed. Computing crystallinity: The crystallinity of the samples was computed using the software DIFFRAC.EVA provided by Bruker AXS GmbH, Karlsruhe. The method is described on page 121 of the user manual. The default parameters for the calculation were used. Computing phase composition: The phase composition was computed against the raw data using the modelling software DIFFRAC.TOPAS provided by Bruker AXS GmbH, Karlsruhe. The crystal structures of the identified phases, instrumental parameters as well the crystallite size of the individual phases were used to simulate the diffraction pattern. This was fit against the data in addition to a function modelling the background intensities. Data collection: The samples were homogenized in a mortar and then pressed into a standard flat sample holder provided by Bruker AXS GmbH for Bragg-Brentano geometry data collection. The flat surface was achieved using a glass plate to compress and flatten the sample powder. The data was collected from the angular range 2 to 70° 2Theta with a step size of 0.02° 2Theta, while the variable divergence slit was set to an angle of 0.4°. The crystalline content describes the intensity of the crystalline signal to the total scattered intensity.
d) The elemental analysis of Al and Si were carried out by an inductively coupled plasmaatomic emission spectrometer (ICP-OES, Spectro Blue Sop instrument) and the elemental analysis of Na were carried out by flame atomic absorption spectroscopy (F-AAS, Spectro Arcos Sop instrument).
e) The determination of the acidity of the solid material was made by temperature programmed desorption of ammonia ($NH_3$-TPD):

The temperature-programmed desorption of ammonia ($NH_3$-TPD) was conducted in an automated chemisorption analysis unit (Micromeritics AutoChem II 2920) having a thermal conductivity detector. Continuous analysis of the desorbed species was accomplished using an online mass spectrometer (OmniStar QMG200 from Pfeiffer Vacuum). The sample (0.1 g) was introduced into a quartz tube and analysed using the program described below. The temperature was measured by means of a Ni/Cr/Ni thermocouple immediately above the sample in the quartz tube. For the analyses, He of purity 5.0 was used. Before any measurement, a blank sample was analysed for calibration.

1. Preparation: Commencement of recording; one measurement per second. Wait for 10 minutes at 25° C. and a He flow rate of 30 $cm^3$/min (room temperature (about 25° C.) and 1 atm); heat up to 600° C. at a heating rate of 20 K/min; hold for 10 minutes. Cool down under a He flow (30 $cm^3$/min) to 100° C. at a cooling rate of 20 K/min (furnace ramp temperature); Cool down under a He flow (30 $cm^3$/min) to 100° C. at a cooling rate of 3 K/min (sample ramp temperature).
2. Saturation with $NH_3$: Commencement of recording; one measurement per second. Change the gas flow to a mixture of 10% $NH_3$ in He (75 $cm^3$/min; 100° C. and 1 atm) at 100° C.; hold for 30 min.
3. Removal of the excess: Commencement of recording; one measurement per second. Change the gas flow to a He flow of 75 $cm^3$/min (100° C. and 1 atm) at 100° C.; hold for 60 min.

4. NH$_3$-TPD: Commencement of recording; one measurement per second. Heat up under a He flow (flow rate: 30 cm$^3$/min) to 600° C. at a heating rate of 10 K/min; hold for 30 min.
5. End of measurement.

Desorbed ammonia was measured by means of the online mass spectrometer, which demonstrated that the signal from the thermal conductivity detector was caused by desorbed ammonia. This involved utilizing the m/z=16 signal from ammonia in order to monitor the desorption of the ammonia. The amount of ammonia adsorbed (mmol/g of sample) was ascertained by means of the Micromeritics software through integration of the TPD signal with a horizontal baseline.

Reference Example 2: Solid Silica Gel

The solid silica gel was purchased from Qingdao Haiyang Chemical Reagent Co, Ltd., and had a pore volume of from 0.9 to 1.0 cm$^3$/g (BET (3H-2000PS2) measured by Beishide Instrument Technology (Beijing) Co., Ltd), a pore size of 10 nm (BET), a particle size (percentage of particles for passing the sieve with 200 mesh) of >90%, a silica content of >98 weight-% (determined by dissolving with HF and subsequent chemical analysis), and a bulk density of 380-480 g/L (tapped and full filling 100 mL measuring cylinder).

Reference Example 3: Organotemplate-Free Synthesis of Chabazite

A zeolitic material having a CHA framework type was prepared as disclosed in WO 2013/068976 A. The crystallinity of the obtained zeolitic material was of 94%, determined as described in Reference Example 1 c). The XRD patterns, determined as described in Reference Example 1 a), of the obtained zeolitic material are displayed in FIG. 1. The XRD patterns of the zeolitic material shows series of peaks associated with the CHA framework structure, in particular a peak at around 9.5 2Theta° with the highest intensity, a peak at around 12.9 2Theta°, a peak around 16 2Theta°, a peak around 18 2Theta°, a peak around 20.5 2Theta°, 2 peaks around 25 to 26 2Theta° and a peak around 30.9 2Theta°.

Elemental analysis of the calcined H-form zeolitic material:
  Si: 35 g/100 g
  Al: 8.3 g/100 g
  Na: 0.42 g/100 g According to the elemental analysis, the SiO$_2$: Al$_2$O$_3$ molar ratio of the respectively obtained zeolitic material was of 8.1:1.

Example 1: Preparation of a Solid Material Comprising a Zeolitic Material Having a Framework Type FER with a FAU Zeolitic Material as a Starting Material Materials:

| | |
|---|---|
| Na-Y Zeolite (CBV100 from Zeolyst International, SiO$_2$:Al$_2$O$_3$ molar ratio of 5.1, Na content of 13.0 weight-% calculated as Na$_2$O and BET specific surface are of 900 m$^2$/g) | 5 g |
| Solid silica gel of Reference Example 2 | 61 g |
| Water | 279 g |
| NaOH (99%, tablets) | 7.5 g |
| Piperidine (99%, solution) | 17.5 g |

279 g of water were placed in a beaker of an open stirring apparatus and 7.5 g of NaOH were dissolved therein. After 5 minutes, 61 g of solid silica gel were added and the mixture was stirred for 5 further minutes. Furthermore, 5 g of Na—Y Zeolite were added and the mixture was again stirred for 5 minutes. Finally, 17.5 g of piperidine was added and the mixture was stirred for 15 minutes. The resulting mixture was separated in two equal parts of approximately 180 g each and each of them were placed in a Berghof autoclave (200 ml). The autoclaves were sealed and placed in a tumble oven, the mixtures crystallized at 150° C. for 3 days (72 hours). After pressure release and cooling to room temperature, one of the obtained suspensions was subjected to filtration and washed three times with deionized water. The filter cake was then dried for 5 hours at a temperature of 120° C. and was calcined at 550° C. for 6 hours.

The solid material was a mixture of zeolitic materials, namely a zeolitic material having a framework type FER (72%), a zeolitic material having a framework type MFI (12%) and a zeolitic material having a framework type FAU-zeolite Y (9%). The crystallinity of the sample was of 89%, determined as described in Reference Example 1 c).

TABLE 1

XRD patterns of the calcined solid material

| Diffraction angle 2theta/° [Cu K (alpha 1)] | Intensity (%) |
|---|---|
| 9.36 | 100 |
| 23.67 | 35 |
| 6.16 | 33 |
| 25.74 | 32 |
| 25.25 | 30 |
| 22.41 | 25 |
| 12.79 | 23 |
| 12.57 | 19 |
| 7.92 | 18 |
| 15.65 | 18 |
| 23.21 | 18 |
| 22.73 | 17 |
| 23.11 | 16 |
| 13.44 | 15 |
| 27.04 | 15 |
| 24.46 | 14 |
| 8.84 | 12 |
| 23.94 | 12 |
| 28.57 | 11 |

The XRD patterns, determined as described in Reference Example 1 a), of the calcined solid material shows series of peaks associated with the FER framework structure, in particular a peak at 9.36 2Theta° with the highest intensity and further peaks with intensities between 10 and 35% (bold values).

Comparative Example 1: Attempt to Prepare a Solid Material Comprising a Zeolitic Material Having a Framework Structure Type FER with a Different Organic Structure Directing Agent Materials:

| | |
|---|---|
| Na-Y Zeolite (CBV100 from Zeolyst International, SiO$_2$:Al$_2$O$_3$ molar ratio of 5.1, Na content of 13.0 weight-% calculated as Na$_2$O and BET specific surface are of 900 m$^2$/g) | 10 g |
| Solid silica gel of Reference Example 2 | 122 g |
| Water | 558 g |
| NaOH (99%, tablets) | 15 g |
| Hexamethyleneimine (99%, solution) | 35 g |

558 g of water were placed in a beaker of an open stirring apparatus and 15 g of NaOH were dissolved therein. After 5 minutes, 122 g of solid silica gel were added and the mixture was stirred for 5 further minutes. Furthermore, 10 g of Na—Y Zeolite were added and the mixture was again stirred for 5 minutes. Finally, 35 g of hexamethyleneimine was added and the mixture was stirred for 15 minutes. The resulting mixture was separated in four equal parts of approximately 180 g each and each of them was placed in a Berghof autoclave. One of the autoclave was sealed and placed in a tumble oven, the mixture crystallized at 150° C. for 3 days (72 hours). After pressure release and cooling to room temperature, one of the obtained suspensions was subjected to filtration and washed five times with deionized water. The filter cake was then dried for 2 hours at a temperature of 120° C. and calcined at 550° C. for 5 hours.

The solid material was a mixture of zeolitic materials, namely a zeolitic material having a framework type FAU-zeolite Y (90%), a zeolitic material having a framework type MTW-zeolite ZSM-12 (7%) and a zeolitic material having a framework type MWW-zeolite ITQ-1 (3%). The crystallinity of the sample was of 37%, determined as described in Reference Example 1 c). The XRD patterns, determined as described in Reference Example 1 a), of the calcined solid material shows series of peaks associated with the FAU framework structure, in particular a peak at 6.17 2Theta° (highest intensity), series of peaks associated with the MTW framework type, series of peaks associated with the MWW framework type as may be taken from Table 2.

TABLE 2

XRD patterns of the calcined solid material

| Diffraction angle 2theta/° [Cu K (alpha 1)] | Intensity (%) |
|---|---|
| 6.17 | 100 |
| 20.91 | 99 |
| 23.62 | 65 |
| 7.40 | 60 |
| 7.57 | 55 |
| 20.34 | 55 |
| 22.94 | 50 |
| 22.80 | 47 |
| 23.27 | 43 |
| 27.00 | 42 |
| 15.62 | 41 |
| 8.84 | 34 |
| 18.69 | 32 |
| 26.03 | 32 |
| 25.81 | 31 |
| 10.07 | 30 |
| 26.24 | 30 |
| 31.39 | 27 |
| 7.15 | 25 |

Comparative Example 1 demonstrates that the use of piperidine as an organic structure directing agent is essential for obtaining a zeolitic material having a framework type FER.

Example 2: Preparation of a Solid Material Comprising a Zeolitic Material Having a Framework Type FER with a FAU Zeolitic Material as a Starting Material Materials:

| | |
|---|---|
| Na—Y Zeolite (CBV100 from Zeolyst International, SiO$_2$:Al$_2$O$_3$ molar ratio of 5.1, Na content of 13.0 weight-% calculated as Na$_2$O and BET specific surface are of 900 m$^2$/g) | 5 g |
| Solid silica gel of Reference Example 2 | 61 g |
| Water | 279 g |
| NaOH (99%, tablets) | 7.5 g |
| Piperidine (99%, solution) | 17.5 g |

279 g of water were placed in a beaker of an open stirring apparatus and 7.5 g of NaOH were dissolved therein. After 5 minutes, 61 g of solid silica gel were added and the mixture was stirred for 5 further minutes. Furthermore, 5 g of Na—Y Zeolite were added and the mixture was again stirred for 5 minutes. Finally, 17.5 g of piperidine was added and the mixture was stirred for 15 minutes. The resulting mixture was separated in two equal parts of approximately 180 g each and each of them was placed in a Berghof autoclave. The autoclaves were sealed and placed in a tumble oven, the mixtures crystallized at 150° C. for 4 days (96 hours). After pressure release and cooling to room temperature, one of the obtained suspensions was subjected to filtration and washed with deionized water. The filter cake was then dried for 5 hours at a temperature of 120° C. and then was calcined at 550° C. for 6 hours.

The solid material was a zeolitic material having a framework type FER, as the main phase, quartz (SiO$_2$) and crystobalite (SiO$_2$). The crystallinity of the sample was of 65%, determined as described in Reference Example 1 c).

Elemental analysis, as described in reference Example 1 d), of the respectively obtained solid material:

Si: 43 g/100 g

Na: 3 g/100 g

Al: 0.83 g/100 g

The BET specific surface area was 94 m$^2$/g, determined as described in Reference Example 1 b).

Example 3: Preparation of a Solid Material Comprising a Zeolitic Material Having a Framework Type FER with a FAU Zeolitic Material as a Starting Material Materials:

| | |
|---|---|
| Na—Y Zeolite (CBV100 from Zeolyst International, SiO$_2$:Al$_2$O$_3$ molar ratio of 5.1, Na content of 13.0 weight-% calculated as Na$_2$O and BET specific surface are of 900 m$^2$/g) | 5 g |
| Solid silica gel of Reference Example 2 | 61 g |
| Water | 279 g |
| NaOH (99%, tablets) | 7.5 g |
| Piperidine (99%, solution) | 17.5 g |

279 g of water were placed in a beaker of an open stirring apparatus and 7.5 g of NaOH were dissolved therein. After 5 minutes, 61 g of solid silica gel were added and the mixture was stirred for 5 further minutes. Furthermore, 5 g of Na—Y Zeolite were added and the mixture was again stirred for 5 minutes. Finally, 17.5 g of piperidine was added and the mixture was stirred for 15 minutes. The resulting mixture was separated in two equal parts of approximately 180 g each and each of them were placed in a Berghof autoclave. The autoclaves were sealed and placed in a tumble oven, the mixtures crystallized at 175° C. for 3 days (72 hours). After pressure release and cooling to room temperature, one of the obtained suspensions was subjected to filtration and washed with deionized water. The filter cake was then dried for 5 hours at a temperature of 120° C. and then was calcined at 550° C. for 6 hours.

The solid material was 90% of a zeolitic material having a framework type FER and 10% of quartz ($SiO_2$). The $SiO_2$ (zeolite+quartz): $Al_2O_3$ molar ratio of the obtained solid material was of 88. The XRD patterns, determined as described in Reference Example 1 a), of the calcined solid material shows series of peaks associated with the FER framework structure and series of peaks associated with quartz as may be taken from Table 3. The crystallinity of the sample was of 90%, determined as described in Reference Example 1 c).

TABLE 3

XRD patterns of the calcined solid material

| Diffraction angle 2theta/° [Cu K (alpha 1)] | Intensity (%) |
|---|---|
| 26.64 | 100 |
| 9.40 | 61 |
| 20.85 | 22 |
| 25.75 | 20 |
| 22.41 | 19 |
| 25.26 | 19 |
| 12.81 | 17 |
| 23.66 | 14 |
| 12.58 | 12 |
| 21.75 | 11 |
| 22.71 | 11 |
| 13.45 | 9 |
| 50.16 | 9 |
| 23.22 | 8 |
| 24.45 | 8 |
| 28.59 | 8 |
| 36.53 | 7 |

The BET specific surface area was 76 $m^2/g$, determined as described in Reference Example 1 b).

Example 3 shows that the synthesis conditions, in particular the crystallization temperature, has an effect of the crystallinity. In particular, increasing the temperature of crystallization permits to optimize the crystallinity of the solid compared to the solid material obtained in Example 1.

Example 4: Preparation of a Solid Material Comprising a Zeolitic Material Having a Framework Type FER with a FAU Zeolitic Material as a Starting Material Materials:

| | |
|---|---|
| Na—Y Zeolite (CBV100 from Zeolyst International, $SiO_2$:$Al_2O_3$ molar ratio of 5.1, Na content of 13.0 weight-% calculated as $Na_2O$ and BET specific surface are of 900 $m^2/g$) | 5 g |
| Solid silica gel of Reference Example 2 | 61 g |
| Water | 279 g |
| NaOH (99%, tablets) | 7.5 g |
| Piperidine (99%, solution) | 17.5 g |

279 g of water were placed in a beaker of an open stirring apparatus and 7.5 g of NaOH were dissolved therein. After 5 minutes, 61 g of solid silica gel were added and the mixture was stirred for 5 further minutes. Furthermore, 5 g of Na—Y Zeolite were added and the mixture was again stirred for 5 minutes. Finally, 17.5 g of piperidine was added and the mixture was stirred for 20 minutes. The resulting mixture was separated in two equal parts of approximately 180 g each and each of them were placed in a Berghof autoclave. The autoclaves were sealed and the mixtures crystallized at 175° C. for 3 days (72 hours) under static state in a drying cabinet.

After pressure release and cooling to room temperature, one of the obtained suspensions was subjected to filtration and washed with deionized water. The filter cake was then dried for 5 hours at a temperature of 120° C. and calcined for 6 hours at a temperature of 550° C.

The solid material was mostly quartz (87%) with FER zeolitic material (13%). The crystallinity of the sample was of 90%, determined as described in Reference Example 1 c).

Examples 3 and 4 show that the use of a tumble oven for crystallization, when using a zeolitic material having a framework type FAU as starting material, permits to increase the amount of a zeolitic material having a framework structure type FER in the obtained solid material.

Example 5: Preparation of a Solid Material Comprising a Zeolitic Material Having a Framework Structure Type FER with a CHA Zeolitic Material as a Starting Material Materials:

| | |
|---|---|
| Zeolite CHA obtained as described in Reference Example 3 | 32.8 g |
| Colloidal silica (40 weight-% suspension in water) | 220 g |
| Water | 770.7 g |
| NaOH solution (50 weight-%) | 70.7 g |
| Piperidine (99%, solution) | 30 g |

670.7 g of water were placed in a beaker of an open stirring apparatus and 70.7 g of NaOH solution were added therein. After 5 minutes, 30 g of piperidine were first added and 32.8 g of zeolite CHA were added under stirring. The mixture was stirred for 60 minutes. After the stirring time, 220 g of colloidal silica were added and the mixture was again stirred for 60 minutes. The resulting mixture was placed in an autoclave (2.5 liter) and rinsed with 100 g of deionized water. The autoclave was sealed and the mixture crystallized at 170° C. for 3 days (72 hours) under rotation at a speed of 250 rpm. After pressure release and cooling to room temperature, the suspension was subjected to filtration and washed five times with deionized water. The filter cake was then dried for 5 hours at a temperature of 120° C. and calcined for 5 hours at 550° C.

The solid material was a mixture of zeolitic materials, namely a zeolitic material having a framework type FER (60%) and a zeolitic material having a framework type MOR (40%). The XRD patterns, determined as described in Reference Example 1 a), of the calcined solid material shows series of peaks associated with the FER framework type, namely a peak at 9.32 2Theta° (highest intensity) and further other peaks, and series of peaks associated with the MOR framework type. The crystallinity of the sample was of 89%, determined as described in Reference Example 1 c).

TABLE 4

XRD patterns of the calcined solid material

| Diffraction angle 2theta/° [Cu K (alpha 1)] | Intensity (%) |
|---|---|
| 9.32 | 100 |
| 25.69 | 75 |
| 22.35 | 65 |
| 25.21 | 54 |
| 13.44 | 48 |
| 12.75 | 35 |
| 9.70 | 34 |
| 12.53 | 33 |

TABLE 4-continued

XRD patterns of the calcined solid material

| Diffraction angle 2theta/° [Cu K (alpha 1)] | Intensity (%) |
|---|---|
| 23.61 | 32 |
| 22.66 | 21 |
| 26.37 | 20 |
| 27.67 | 20 |
| 23.20 | 19 |
| 28.52 | 17 |
| 6.45 | 16 |
| 19.63 | 14 |
| 24.40 | 13 |
| 26.97 | 11 |
| 30.96 | 11 |

Elemental analysis, determined as described in Reference Example 1 d), of the respectively obtained solid material:

Si: 37 g/100 g

Al: 3.9 g/100 g

Na: 1.4 g/100 g

The BET specific surface area of the respectively obtained solid material was of 328 m²/g, as determined in Reference Example 1 b).

Example 5 shows that by replacing the starting zeolitic material, and in particular using CHA zeolitic material, it is also possible to synthesize a zeolitic material having a framework type FER.

Example 6: Preparation of a Zeolitic Material Having a Framework Structure Type FER with a CHA Zeolitic Material as a Starting Material Materials:

| | |
|---|---|
| Zeolite CHA obtained as described in Reference Example 3 | 32.8 g |
| Colloidal silica (40 weight-% suspension in water) | 220 g |
| Water | 770.7 g |
| NaOH solution (50 weight-%) | 70.7 g |
| Piperidine (99%, solution) | 190 g |

670 g of water were placed in a beaker of an open stirring apparatus and 70.7 g of NaOH solution were added therein. After 5 minutes, 190 g of piperidine were first added and 32.8 g of zeolite CHA were added under stirring. The mixture was stirred for 60 minutes. After the stirring time, 220 g of colloidal silica were added and the mixture was again stirred for 60 minutes. The resulting mixture was placed in an autoclave (2.5 liter) and rinsed with 100 g of deionized water. The autoclave was sealed and the mixture crystallized at 170° C. for 3 days (72 hours) under rotation at a speed of 250 rpm. After pressure release and cooling to room temperature, the suspension was subjected to filtration and washed three times with deionized water. The filter cake was then dried for 2 hours at a temperature of 120° C. and calcined for 5 hours at 550° C. The $SiO_2$: $Al_2O_3$ molar ratio of the obtained zeolitic material was of 17. The XRD patterns, determined as described in Reference Example 1 a), of the calcined zeolitic material shows series of peaks associated with the FER framework structure as illustrated in Table 5 below. The crystallinity of the sample was of 90%, determined as described in Reference Example 1 c).

TABLE 5

XRD patterns of the calcined zeolitic material

| Diffraction angle 2theta/° [Cu K (alpha 1)] | Intensity (%) |
|---|---|
| 9.36 | 100 |
| 25.23 | 30 |
| 25.70 | 27 |
| 22.38 | 26 |
| 12.78 | 20 |
| 23.62 | 19 |
| 12.57 | 18 |
| 22.66 | 16 |
| 13.45 | 14 |
| 24.38 | 12 |
| 23.17 | 11 |
| 28.53 | 11 |
| 29.37 | 8 |
| 26.99 | 7 |
| 15.68 | 6 |
| 23.87 | 6 |
| 26.44 | 6 |
| 15.43 | 5 |

Elemental analysis, determined as described in Reference Example 1 d), of the respectively obtained zeolitic material:

Si: 39 g/100 g

Al: 4.4 g/100 g

Na: 0.9 g/100 g The BET specific surface area of the respectively obtained zeolitic material was of 328 m²/g, as determined in Reference Example 1 b).

Examples 5 and 6 demonstrate that using an increased amount of piperidine as the structure directing agent permits to increase the crystallinity and to obtain a solid material consisting of a zeolitic material having a framework type FER.

Example 7: Preparing the H-Form of the Solid Material of Example 3

Materials:

| | |
|---|---|
| Solid material obtained in Example 3 | 39 g |
| NH₄NO₃ p.a. (99 weight-%) | 40 g |
| Deionized water | 360 g |

40 g of $NH_4NO_3$ p.a. was mixed with 360 g of deionized water forming an ammonium nitrate solution. 39 g of the zeolitic material obtained in Example 3 is ion-exchanged with 400 g of the $NH_4NO_3$ solution at 80° C. for 2 hours (agitating at 150 rpm in a 1 liter flask). The obtained solid material was then filtered, pumped out and dried in an oven at 120° C. for 12 hours. Finally, the dried solid material was calcined at 550° C. for 5 hours. The procedure was repeated once.

The obtained solid material was 80% of a zeolitic material having a framework structure FER and 20% of quartz ($SiO_2$). The $SiO_2$ (zeolite+quartz): $Al_2O_3$ molar ratio of the obtained solid material was of 88 and the crystallinity of the sample was of 92%, determined as described in Reference Example 1 c). The micropore volume was of 0.03 ml/g, as determined in Reference Example 1 b). The total acidity was of 0.3 mmol/g, including 0.2 mmol/g of weak acidity and 0.1 mmol/g of medium acidity, determined as described in Reference Example 1 d). Without wanting to be bound by any theory, it could be assumed that the acidity of the sample is in particular due to the high silica to alumina molar ratio. The BET specific surface area was of 91 m²/g, as determined in Reference Example 1 b). Example 8 shows that the ion-exchange to the H-form of Example 3 increased the amount of quartz in the sample.

Example 8: Preparing the H-Form of the Zeolitic Material of Example 6

Materials:

| | |
|---|---|
| Zeolitic material having a framework structure FER obtained in Example 6 | 40 g |
| $NH_4NO_3$ p.a. (99 weight-%) | 40 g |
| Deionized water | 360 g |

40 g of $NH_4NO_3$ p.a. was mixed with 360 g of deionized water forming an ammonium nitrate solution. 40 g of the zeolitic material obtained in Example 6 is ion-exchanged with 400 g of the $NH_4NO_3$ solution at 80° C. for 2 hours (agitating at 150 rpm). The obtained zeolitic material was then filtered, pumped out and dried in an oven at 120° C. for 2 hours. Finally, the dried zeolitic material was calcined at 500° C. for 5 hours. The procedure was repeated once.

The $SiO_2$: $Al_2O_3$ molar ratio of the obtained zeolitic material was of 17 and the crystallinity of the sample was of 98%, determined as described in Reference Example 1 c). The BET specific surface area of the respectively obtained H-form zeolitic material having a framework structure FER was of 328 $m^2/g$, as determined in Reference Example 1 b). The micropore volume was of 0.13 ml/g, as determined in Reference Example 1 b). The total acidity was of 1.7 mmol/g, including 1 mmol/g of weak acidity and 0.7 mmol/g of medium acidity, determined as described in Reference Example 1 d).

Example 9: Use of the Solid Materials Obtained in Example 8 for NOx Conversion The solid material obtained in Example 8 was impregnated via incipient wetness with an aqueous copper nitrate solution wherein the amount of copper nitrate was chosen so that, in the finally obtained material containing copper supported on the zeolitic material, the amount of copper was 4 weight-%, calculated as CuO, based on the total weight of the solid material having Cu supported thereon. After this impregnation, the obtained product was stored in an oven for 20 hours at 50° C. The product was then dried and calcined in air at 450° C. for 5 hours.

Further, shaped samples were prepared by mixing the obtained ion-exchanged solid material with a pre-milled gamma alumina slurry (70 weight-% of zeolitic material, 30 weight-% of alumina). The slurry was dried under stirring on a magnetic stirring plate at 100° C. and calcined in air for 1 h at 550° C. The resulting cake was crushed and sieved to a target fraction of 250-500 micrometers for testing. Fractions of the shaped powder were aged in a muffle oven for 50 h at 650° C. in 10% steam/air and for 16 h at 800° C. in 10% steam/air. 170 mg of the obtained fresh catalyst were diluted to 1 ml with corundum. This corresponds to 1 ml coated with 120 g/l zeolite in the washcoat.

The catalytic activities of the fresh and aged catalyst were measured in 48 fold parallel testing unit equipped with ABB LIMAS NOx/$NH_3$ and ABB URAS $N_2O$ analyzers (ABB AO2020 series). For each sample, 170 mg of the obtained fresh catalyst and aged catalyst (ageing 50 h, at 650° C.) were diluted with corundum to a total volume of 1 ml and were placed in each reactor. Under isothermal conditions (T=175, 200, 250, 300, 450, 550, 575° C.), a feed gas consisting of 500 ppm NO, 500 ppm $NH_3$, 5% $O_2$, 10% $H_2O$ balance $N_2$ was passed at a gas hourly space velocity (GHSV) of 80 000 $h^{-1}$ through the catalyst bed. In addition to 30 min waiting time for thermal equilibration of the parallel reactor at each temperature, every position was equilibrated for 3 minutes followed by 30 seconds sampling time. Data recorded by the analyzers at a frequency of 1 Hz was averaged for the sampling interval and used to calculate NO conversions and $N_2O$ yield. The results are displayed in FIGS. 2 and 3.

As may be taken from FIG. 2, the catalyst comprising the Cu-containing solid material (FER zeolitic material) according to the present invention shows a NOx conversion of about 95 to 100% at temperatures in the range of 300 to 450° C. and exhibits a $T_{50}$ of approximately 250° C. Thus, this example demonstrates that the solid material obtained according to the present invention exhibits great catalytic activities.

Reference Example 4: Synthesis of an AEI Zeolitic Material 20.194 kg of distilled water were placed in a 60 L autoclave reactor and stirred at 200 rpm. 2.405 kg of a solution of 50 wt.-% NaOH in distilled water were then added followed by the addition of 6.670 kg of 1,1,3,5-tetramethylpiperidinium hydroxide. 560 g of zeolite Y seeds ($NH_4$-zeolite Y having a silica to alumina molar ratio of 5.2:1, a BET specific surface area of 659 $m^2/g$ and 0.2 wt.-% $Na_2O$) were then suspended in 3 L of distilled water and the suspension was the added to the reactor while stirring, after which 7.473 kg of colloidal silica (aqueous solution, 40 weight-%) were added. The resulting mixture displaying molar ratios of 1.00 $SiO_2$: 0.30 $Na_2O$: 0.17 template: 0.19 zeolite Y: 41.5 $H_2O$ was further stirred for 30 min at room temperature, after which the reactor was closed and the reaction mixture was heated under autogenous pressure in 1.5 h to 160° C. and subsequently maintained at that temperature for 48 h while further stirring.

The resulting suspension was filled into five 10 L canisters and the suspension allowed to settle, after which the clear supernatant was decanted off. The solid residue was placed in a filter and washed with distilled water to <200 pS. The filter cake was then dried at 120° C. over night to afford 1.1848 kg of a crystalline solid, which was subsequently heated at 2° C./min to 500° C. and calcined at that temperature for 5 hours under air. After said calcination, the calcined zeolitic material was subject to a further calcination step, wherein it was heated at 2° C./min to 550° C. and calcined at that temperature for 5 h to afford 1.0810 kg of the sodium form of a zeolitic material. X-ray diffraction analysis of the zeolitic material revealed an AEI type framework structure. The Na-AEI zeolite displayed a BET surface area as obtained from the nitrogen isotherms of 506 $m^2/g$ and a Langmuir surface area of 685 $m^2/g$.

Elemental analysis, as described in reference Example 1 d), of the resulting Na-AEI zeolite:

Si: 34 g/100 g
Al: 5.1 g/100 g
Na: 2 g/100 g.

Accordingly, the zeolite displayed a $SiO_2$:$Al_2O_3$ molar ratio of 12.9:1.

$NH_3$-TPD analysis of the Na-AEI zeolite afforded a total amount of acid sites of 1.4 mmol/g, wherein the deconvoluted desorption spectrum included a peak at 515° C. having an amount of acid sites of 0.6 mmol/g.

Example 10: Preparation of a Zeolitic Material Having a Framework Structure Type FER with a AEI Zeolitic Material as a Starting Material Materials:

| | |
|---|---|
| Zeolite AEI obtained as described in Reference Example 4 | 9.4 g |
| Piperidine (99%, solution) | 54.1 g |
| Colloidal silica (40 weight-% suspension in water) | 62.8 g |
| Water | 230.8 g |
| NaOH (99%, tablets) | 10.1 g |

230.8 g of water were placed in a beaker of an open stirring apparatus and 10.1 g of NaOH were dissolved therein. After 5 minutes, 54.1 g of piperidine and 9.4 g of zeolite AEI were added and the mixture was stirred for 60 minutes. Finally, after the stirring of 60 minutes, 62.8 g of colloidal silica were added and the mixture was stirred for another 60 minutes. The resulting mixture was separated in two equal parts of approximately 170 g each and one of them was placed in a Teflon autoclave. Said autoclave was sealed and placed in a tumble oven, the mixture crystallized at 170° C. for 3 days (72 hours) at 40 U/min. After pressure release and cooling to room temperature, the obtained suspension was subjected to filtration and washed with 3 L of deionized water at 80° C. to 80 µS (microsiemens). The filter cake was then dried for 2 hours at a temperature of 120° C. and then was calcined at 550° C. for 5 hours.

The solid material was a zeolitic material having a framework type FER, as the main phase, with some traces of an unknown component. The crystallinity of the sample was of 90%, determined as described in Reference Example 1 c). The XRD patterns, determined as described in Reference Example 1 a), of the calcined zeolitic material shows series of peaks associated with the FER framework structure as illustrated in Table 6 below.

TABLE 6

XRD patterns of the calcined solid material

| Diffraction angle 2theta/° [Cu K (alpha 1)] | Intensity (%) |
|---|---|
| 9.35 | 100 |
| 25.22 | 34 |
| 25.69 | 33 |
| 22.35 | 31 |
| 12.76 | 27 |
| 23.61 | 25 |
| 12.54 | 21 |
| 22.65 | 19 |
| 13.42 | 18 |
| 23.16 | 13 |
| 24.39 | 13 |
| 28.53 | 12 |
| 26.97 | 9 |
| 29.35 | 9 |
| 15.66 | 8 |
| 26.45 | 7 |
| 15.40 | 6 |
| 23.85 | 5 |
| 30.34 | 4 |
| 47.36 | 4 |

Elemental analysis, as described in reference Example 1 d), of the respectively obtained solid material:
Si: 39 g/100 g
Al: 2.7 g/100 g
Na: 1.1 g/100 g Thus, the solid material had a silica to alumina molar ratio of about 28:1.

Reference Example 5: Synthesis of a LEV Zeolitic Material

The LEV zeolitic material was prepared as in Example 1 of WO 2011/158218 A1. Thus, according to the elemental analysis the Si:Al:Na molar ratio of the zeolitic material was about 9.6:1:0.17. Thus, the zeolitic material had a silica to alumina molar ratio of 19.2:1.

Example 11: Preparation of a Zeolitic Material Having a Framework Structure Type FER with a LEV Zeolitic Material as a Starting Material Materials:

| | |
|---|---|
| Zeolite LEV obtained as described in Reference Example 5 | 9.4 g |
| Piperidine (99%, solution) | 54.1 g |
| Colloidal silica (40 weight-% suspension in water) | 62.8 g |
| Water | 230.2 g |
| NaOH (99%, tablets) | 10.1 g |

230.2 g of water were placed in a beaker of an open stirring apparatus and 10.1 g of NaOH were dissolved therein. After 5 minutes, 54.1 g of piperidine and 9.4 g of zeolite LEV were added and the mixture was stirred for 60 minutes. Finally, after the stirring of 60 minutes, 62.8 g of colloidal silica were added and the mixture was stirred for another 60 minutes. The resulting mixture was separated in two equal parts of approximately 170 g each and one of them was placed in a Teflon autoclave. Said autoclave was sealed and placed in a tumble oven, the mixture crystallized at 170° C. for 3 days (72 hours) at 40 U/min. After pressure release and cooling to room temperature, the obtained suspension was subjected to filtration and washed with 3 L of deionized water at 80° C. to 30 ρS (microsiemens). The filter cake was then dried for 2 hours at a temperature of 120° C. and then was calcined at 550° C. for 5 hours.

The solid material was a zeolitic material having a framework type FER, as the main phase, with minor impurities. The crystallinity of the sample was of 86%, determined as described in Reference Example 1 c). The XRD patterns, determined as described in Reference Example 1 a), of the calcined zeolitic material shows series of peaks associated with the FER framework structure as illustrated in Table 7 below.

TABLE 7

XRD patterns of the calcined solid material

| Diffraction angle 2theta/° [Cu K (alpha 1)] | Intensity (%) |
|---|---|
| 9.43 | 100 |
| 25.30 | 19 |
| 25.76 | 19 |
| 22.42 | 17 |
| 12.82 | 14 |
| 23.67 | 14 |
| 12.58 | 11 |
| 22.72 | 11 |

TABLE 7-continued

XRD patterns of the calcined solid material

| Diffraction angle 2theta/° [Cu K (alpha 1)] | Intensity (%) |
|---|---|
| 13.48 | 9 |
| 24.45 | 9 |
| 23.23 | 7 |
| 28.61 | 7 |
| 26.52 | 6 |
| 15.74 | 5 |
| 27.06 | 5 |
| 29.43 | 5 |
| 15.49 | 4 |
| 23.89 | 4 |

Elemental analysis, as described in reference Example 1 d), of the respectively obtained solid material:
Si: 41 g/100 g
Al: 3 g/100 g
Na: 0.8 g/100 g
Thus, the solid material had a silica to alumina ratio of about 26:1.

CITED LITERATURE

Figure 1:
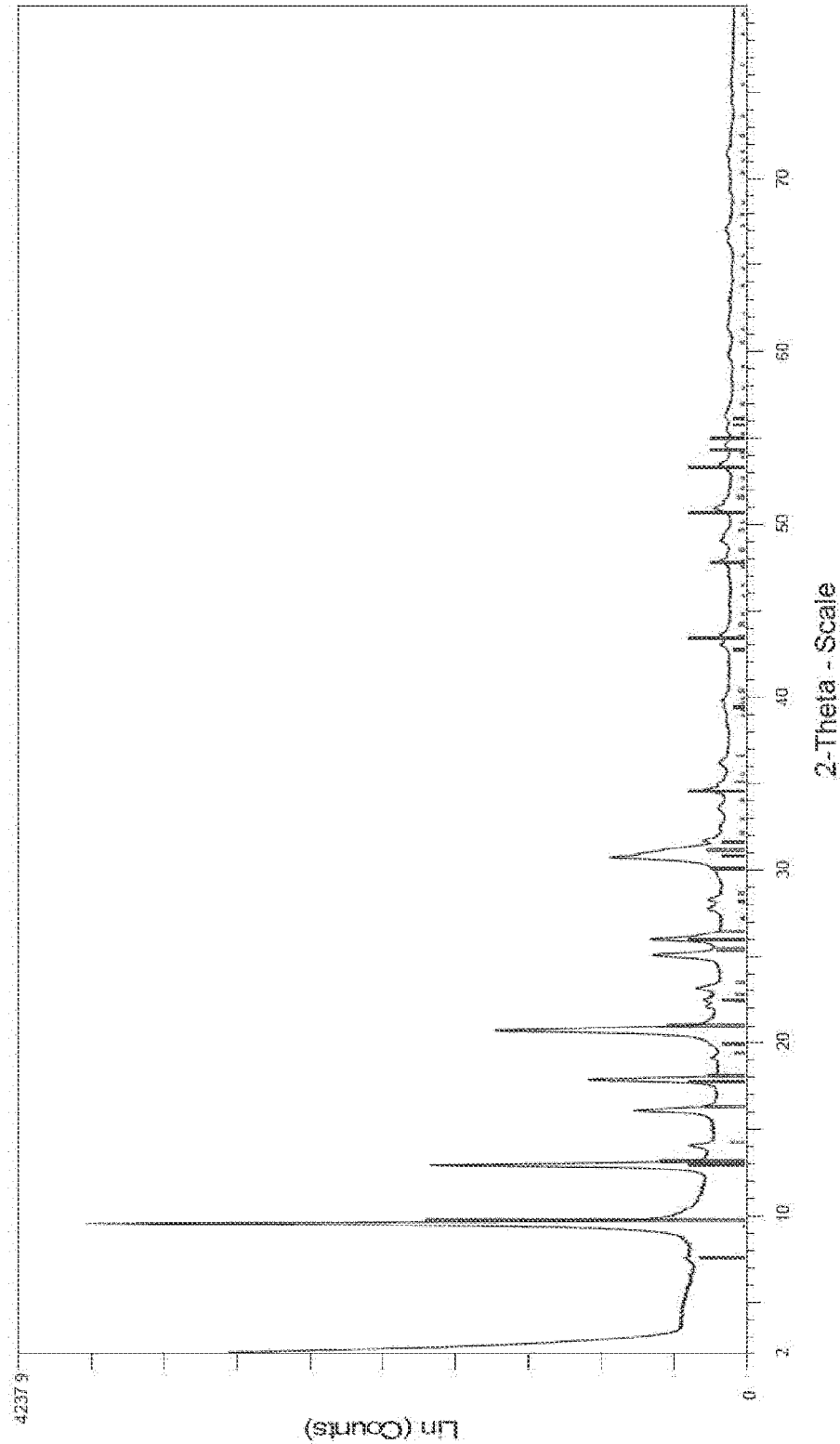
FIG. 1 shows the XRD patterns of the respectively obtained CHA zeolitic material according to Reference Example 3.
Figure 2:
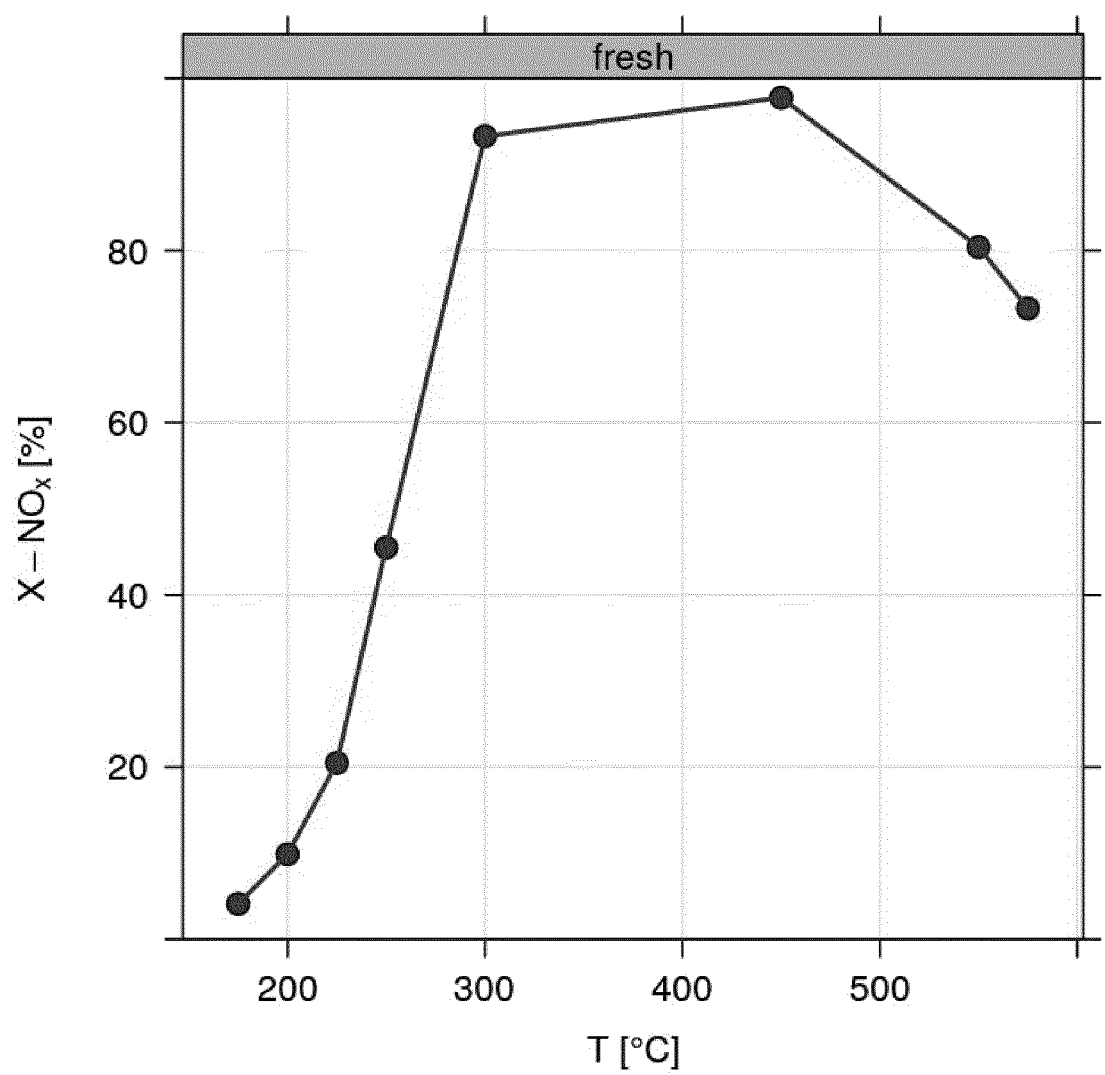
FIG. 2 shows the NOx conversions of a fresh catalyst comprising the ion-exchanged solid material at 200 to 600° C. (X-NOx=NOx conversion).
Figure 3:
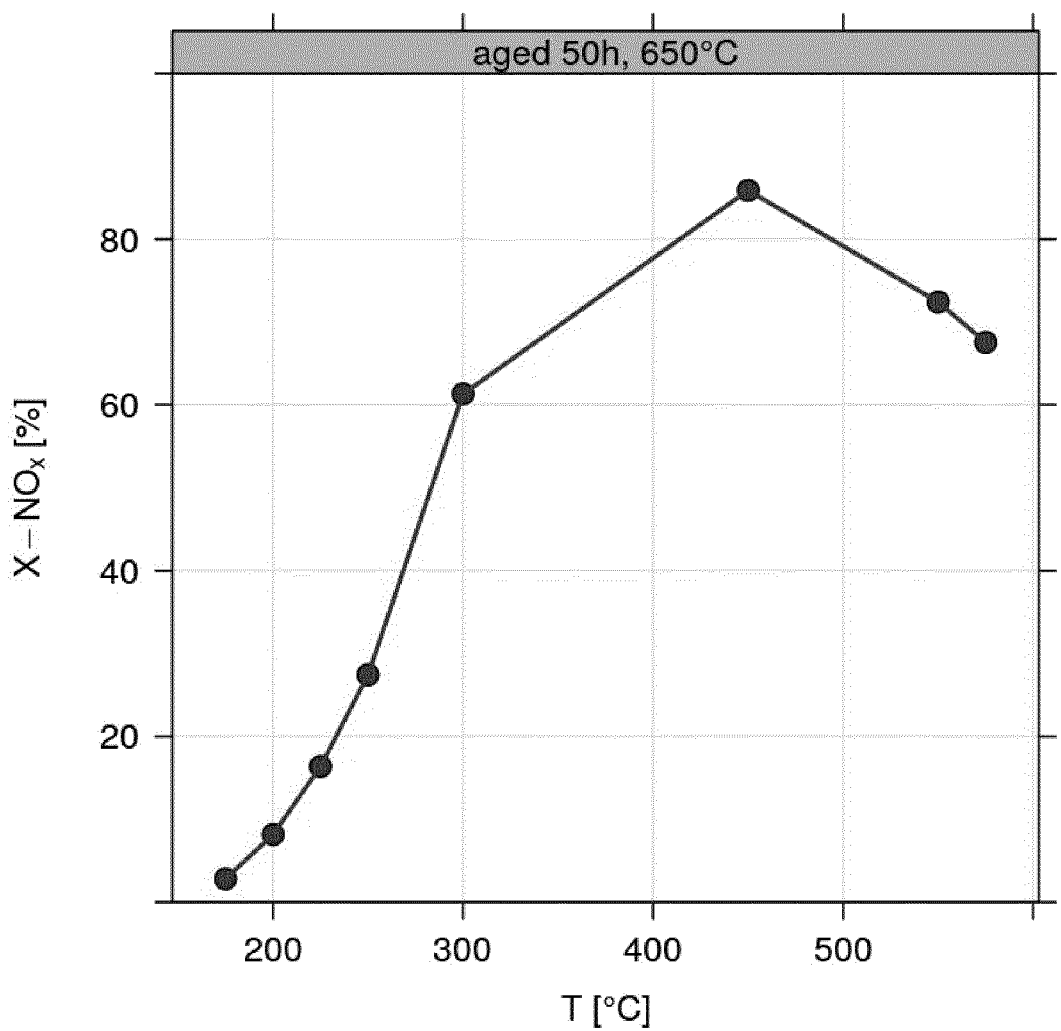
FIG. 3 shows the NOx conversions of an aged catalyst comprising the ion-exchanged solid material at 200 to 600° C. (X-NOx=NOx conversion).

Haiyan Zhang et al., "Organotemplate-free synthesis of high-silica ferrierite zeolite induced by CDO-structure zeolite buikding units, J. Mater. Chem., 2011, 21, 9494
Zhenchao Zhao et al., "Insights into the topotactic conversion process from layered silicate RUB-36 to FER-type zeolite by layer assembly", Chem. Mater., 2013, 25, 840-847 Gabrielly Pal-Borbely et al., "Solid-state recrystallization of aluminum-containing kanemite varieties to ferrierite", Microporous and Mesoporous Materials 35-36 (2000), 573-584
Yu Wang et al., "ZSM-5 and ferrierite synthesized by magadiite conversion method in 1,6-hexethylenediamine system", Microporous and Mesoporous Materials 208 (2015), 66-71
WO 2013/068976 A
WO 2011/158218 A1

The invention claimed is:

1. A process for preparing a zeolitic material having a framework type FER and having a framework structure comprising silicon, aluminum, and oxygen, the process comprising:
preparing an aqueous synthesis mixture comprising water; a zeolitic material having a framework type other than FER and having a framework structure comprising silicon, aluminum, and oxygen; a source of silicon other than the zeolitic material having a framework type other than FER; an organic structure directing agent comprising piperidine; a source of an alkali metal; and a source of a base;
subjecting the aqueous synthesis mixture to hydrothermal synthesis conditions comprising heating the aqueous synthesis mixture to a temperature in the range of from 140 to 190° C. and keeping the synthesis mixture at a temperature in this range under autogenous pressure, obtaining a mother liquor comprising a solid material which comprises the zeolitic material having a framework type FER.

2. The process of claim 1, wherein in in the framework structure of the zeolitic material having a framework type other than FER, the molar ratio of silicon relative to aluminum, calculated as $SiO_2:Al_2O_3$, is in the range of from 2:1 to 40:1.

3. The process of claim 1, wherein the framework type of the zeolitic material having a framework type other than FER is at least one selected from the group consisting of FAU, CHA, LEV, and AEI.

4. The process of claim 1, wherein the framework type of the zeolitic material having a framework type other than FER is CHA,
wherein in the framework structure of the zeolitic material having a framework type other than FER, the molar ratio of silicon relative to aluminum, calculated as $SiO_2:Al_2O_3$, is in the range of from 5:1 to 30:1.

5. The process of claim 1, wherein the framework type of the zeolitic material having a framework type other than FER is FAU,
wherein in the framework structure of the zeolitic material having a framework type other than FER, the molar ratio of silicon relative to aluminum, calculated as $SiO_2:Al_2O_3$, is in the range of from 2:1 to 8:1.

6. The process of claim 1, wherein the framework type of the zeolitic material having a framework type other than FER is AEI,
wherein in the framework structure of the zeolitic material having a framework type other than FER, the molar ratio of silicon relative to aluminum, calculated as $SiO_2:Al_2O_3$, is in the range of from 2:1 to 30:1.

7. The process of claim 1, wherein the framework type of the zeolitic material having a framework type other than FER is LEV,
wherein in the framework structure of the zeolitic material having a framework type other than FER, the molar ratio of silicon relative to aluminum, calculated as $SiO_2:Al_2O_3$, is in the range of from 2:1 to 30:1.

8. The process of claim 1, wherein the organic structure directing agent comprises from 95 to 100 weight-% piperidine and from 0 to 1 weight % hexamethylene imine, each relative to the weight of the organic structure directing agent.

9. The process of claim 1, wherein the source of silicon other than the zeolitic material having a framework type other than FER comprises at least one selected from the group consisting of a silicate, a silica gel, a silica sol, a silica powder, a solid silica gel, and a colloidal silica.

10. The process of claim 1, wherein in the aqueous synthesis mixture, the weight ratio of the zeolitic material having a framework type other than FER relative to the source of a base is in the range of from 1:1 to 1:4.

11. The process of claim 1, wherein the preparing the aqueous synthesis mixture comprises:
mixing water with the source of an alkali metal and the source of a base, obtaining a first mixture;
adding the source of silicon other than the zeolitic material having a framework type other than FER to the first mixture, obtaining a second mixture;

adding the zeolitic material having a framework type other than FER to the second mixture, obtaining a third mixture; and adding the organic structure directing agent comprising piperidine to the third mixture, obtaining a fourth mixture;

or wherein the preparing the aqueous synthesis mixture according to (i) comprises:

mixing water with the source of an alkali metal and the source of a base, obtaining a first mixture;

adding the organic structure directing agent comprising piperidine and the zeolitic material having a framework type other than FER to the first mixture, obtaining a second mixture; and adding the source of silicon other than the zeolitic material having a framework type other than FER to the second mixture, obtaining a third mixture.

12. The process of claim 1, further comprising:

optionally cooling the mother liquor to a temperature in the range of from 10 to 50° C.; and separating the solid material from the mother liquor.

13. The process of claim 12, further comprising:

calcining the solid material in a gas atmosphere having a temperature in the range of from 450 to 650° C.

14. The process of claim 12, further comprising subjecting the solid material to ion-exchange conditions.

15. The process of claim 14, wherein the subjecting the solid material to ion-exchange conditions comprises bringing a solution comprising ammonium ions in contact with the solid material, obtaining a solid material in its ammonium form;

optionally drying the solid material in its ammonium form in a gas atmosphere;

optionally calcining the solid material in its ammonium form in a gas atmosphere, obtaining the H-form of the solid material; and bringing a solution comprising ions of one or more transition metals in contact with the solid material in its ammonium form or in contact with the H-form of the solid material.

16. A solid material comprising a zeolitic material having a framework type FER, or obtained by the process of claim 1.

17. The solid material of claim 16, having a molar ratio of silicon relative to aluminum, calculated as $SiO_2:Al_2O_3$, in the range of from 2:1 to 150:1.

18. The solid material of claim 16, having a micropore volume in the range of from 0.01 to 0.50 ml/g.

19. A method for catalytic reduction of nitrogen oxides in an exhaust gas stream of a diesel engine, comprising contacting the solid material of claim 16 with the exhaust gas stream.

20. A method for isomerization of olefins, comprising contacting the solid material of claim 16 with the olefins.

* * * * *